US011979183B2

(12) United States Patent
Hutchinson et al.

(10) Patent No.: US 11,979,183 B2
(45) Date of Patent: *May 7, 2024

(54) COVER FOR A REGION OF A MOBILE PHONE

(71) Applicant: Medway Plastics Corporation, Long Beach, CA (US)

(72) Inventors: Richard E. Hutchinson, Lakewood, CA (US); Thomas A. Hutchinson, Coto De Caza, CA (US); Gerald A. Hutchinson, Austin, TX (US); Steven J. Weaver, Signal Hill, CA (US)

(73) Assignee: Medway Plastics Corporation, Long Beach, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/508,408

(22) Filed: Oct. 22, 2021

(65) Prior Publication Data
US 2022/0116068 A1 Apr. 14, 2022

Related U.S. Application Data

(63) Continuation of application No. 16/830,860, filed on Mar. 26, 2020, now Pat. No. 11,290,140, which is a
(Continued)

(51) Int. Cl.
*H04B 1/3888* (2015.01)
*H04M 1/02* (2006.01)

(52) U.S. Cl.
CPC ........ *H04B 1/3888* (2013.01); *H04M 1/0202* (2013.01)

(58) Field of Classification Search
CPC .. H04B 1/3888; H04M 1/0202; H04M 1/185; A45C 2011/002; A45C 11/00
(Continued)

(56) References Cited

U.S. PATENT DOCUMENTS 5,360,108 A * 11/1994 Alagia ................. H01H 9/0242
206/320
7,907,394 B2 * 3/2011 Richardson ........... G06F 1/1613
361/679.02
(Continued)

FOREIGN PATENT DOCUMENTS

CN 1234567 C * 1/2006 ............... B65B 1/32
CN 206472974 A 9/2017
(Continued)

OTHER PUBLICATIONS

International Search Report and Written Opinion dated Aug. 6, 2019 for Application No. PCT/UC19/32725, 16 pages.
(Continued)

*Primary Examiner* — Mahendra R Patel
(74) *Attorney, Agent, or Firm* — Knobbe Martens Olson & Bear LLP

(57) ABSTRACT

Disclosed are covers for a mobile phone including aspects that protect the phone from impact and/or provide shock absorbance characteristics. Covers can include one or more protrusions that reduce the contact surface to the phone and dissipate energy. Advantageously, the one or more protrusions work with intermittent spaces to provide shock absorbing characteristics and reduce the contact surface area between the cover and the phone. In some embodiments, the protrusions can include a soft-side rectangular shape, where the protrusions are placed in an ordered array in the back wall of a cover. In some embodiments, the one or more protrusions can include a row of x-shaped protrusions interspersed with air pockets along the inside wall of the cover.

17 Claims, 40 Drawing Sheets

Related U.S. Application Data continuation of application No. 16/414,358, filed on May 16, 2019, now Pat. No. 10,608,690.

(60) Provisional application No. 62/673,614, filed on May 18, 2018.

(58) Field of Classification Search
USPC ........................................................ 455/575.8
See application file for complete search history.

(56) References Cited

U.S. PATENT DOCUMENTS

| | | | | |
|---|---|---|---|---|
| 8,509,865 | B1* | 8/2013 | LaColla | H04B 1/3888 |
| | | | | 455/575.8 |
| 8,706,176 | B1* | 4/2014 | Jia | H04M 1/04 |
| | | | | 455/575.8 |
| 9,456,066 | B2* | 9/2016 | Singhal | G06F 1/1626 |
| 9,876,522 | B2* | 1/2018 | Huang | H04B 1/3888 |
| 10,005,611 | B2* | 6/2018 | Rayner | G06F 1/1626 |
| 10,608,690 | B2 | 3/2020 | Hutchinson et al. | |
| 11,290,140 | B2 | 3/2022 | Hutchinson et al. | |
| D949,137 | S | 4/2022 | Hutchinson et al. | |
| 2007/0155451 | A1* | 7/2007 | Lee | H04M 1/0237 |
| | | | | 455/575.4 |
| 2011/0110063 | A1* | 5/2011 | Sauers | H05K 5/0017 |
| | | | | 361/796 |
| 2012/0274195 | A1 | 11/2012 | Thompson et al. | |
| 2012/0325720 | A1 | 12/2012 | Tages et al. | |
| 2013/0193006 | A1* | 8/2013 | Bergreen | H04B 1/3888 |
| | | | | 206/37 |
| 2013/0292269 | A1 | 11/2013 | Tages | |
| 2014/0048441 | A1* | 2/2014 | Tages | G06F 1/1633 |
| | | | | 206/521 |
| 2014/0216953 | A1 | 8/2014 | Su et al. | |
| 2014/0221056 | A1* | 8/2014 | Gandhi | H04B 1/3888 |
| | | | | 455/575.8 |
| 2014/0252786 | A1* | 9/2014 | Singhal | H04B 1/3888 |
| | | | | 294/137 |
| 2015/0001104 | A1* | 1/2015 | Kim | B65D 81/022 |
| | | | | 206/37 |
| 2015/0062787 | A1 | 3/2015 | Wilson et al. | |
| 2015/0119118 | A1* | 4/2015 | Ashley | H04B 1/3888 |
| | | | | 455/575.8 |
| 2015/0194995 | A1* | 7/2015 | Fathollahi | H04B 1/3888 |
| | | | | 455/575.8 |
| 2015/0227167 | A1* | 8/2015 | Chiang | H04M 1/0202 |
| | | | | 362/616 |
| 2015/0327643 | A1* | 11/2015 | Magness | A45C 11/00 |
| | | | | 224/191 |
| 2016/0106189 | A1* | 4/2016 | Takayama | A45C 11/00 |
| | | | | 493/162 |
| 2016/0192751 | A1* | 7/2016 | Corcoran | A45C 11/00 |
| | | | | 224/245 |
| 2016/0262513 | A1 | 9/2016 | O'Neill | |
| 2016/0327113 | A1* | 11/2016 | Shelley | B32B 3/30 |
| 2017/0086551 | A1* | 3/2017 | Rayner | A45C 13/008 |
| 2017/0172331 | A1* | 6/2017 | Publicover | B32B 7/022 |
| 2017/0327292 | A1* | 11/2017 | Kim | A45C 11/00 |
| 2017/0359096 | A1* | 12/2017 | Witter | G06F 1/1656 |
| 2018/0332939 | A1* | 11/2018 | Chiang | A45C 11/00 |
| 2019/0296321 | A1* | 9/2019 | Newman | H01M 50/296 |

FOREIGN PATENT DOCUMENTS

| | | | | |
|---|---|---|---|---|
| CN | 207039703 | | 2/2018 | |
| CN | 207039703 U | * | 2/2018 | |
| KR | 2014-0088276 | | 7/2014 | |
| KR | 101777505 | | 9/2017 | |
| WO | WO-2006058013 A2 | * | 6/2006 | .............. A42B 3/12 |
| WO | WO 2019/222540 | | 11/2019 | |

OTHER PUBLICATIONS

International Preliminary Report on Patentability and Written Opinion in application No. PCT/US2019/032725, dated May 7, 2020, in 7 pages.

European Search report in application No. 19804414.1, dated Mar. 17, 2022, in 10 pages.

* cited by examiner

COVER FOR A REGION OF A MOBILE PHONE

CROSS REFERENCE TO RELATED APPLICATIONS

This application is a continuation application of U.S. patent application Ser. No. 16/830,860, filed Mar. 26, 2020, which is a continuation application of U.S. patent application Ser. No. 16/414,358, filed May 16, 2019, which claims the benefit of U.S. Patent Application No. 62/673,614, filed May 18, 2018, the entire disclosures of which are hereby incorporated by reference herein for all that it contains, for all purposes.

BACKGROUND

Field

The current subject matter relates to mobile phone covers and protection.

Related Art

Cell phone cases have become a popular accessory for cell phones, providing aesthetic and storage features. The cell phone cases have also been used to provide screen protection. Consumers are often dropping mobile phones on hard surfaces and the internal electronics and the screen are prone to damage. However, traditional phone cases often do not effectively distribute the shock. Instead, traditional phone cases simply provide an additional layer. Thus, there is a need for a phone case with shock absorption and dispersion capabilities to protect cell phones from impact, such as may occur when a consumer drops a cell phone.

SUMMARY

The systems, methods, and devices of this disclosure each have several innovative aspects, no single one of which is solely responsible for the all of the desirable attributes disclosed herein.

For example, some embodiments include a cover for a region of a mobile phone. The cover can comprise: a back wall; a left side wall extending from a first side of the back wall; a right side wall extending from a second side of the back wall; a bottom wall extending from a third side of the back wall; and a top wall extending from a fourth side of the back wall. These walls can all have inside and outside portions or surfaces and they can collectively be capable of housing a mobile phone. The cover can also have one or more protrusions disposed on the inside portion of the back wall, wherein the one or more protrusions reduce the contact surface between the cover and the mobile phone and provide shock absorbing characteristics when the mobile phone is housed by the cover. These protrusions can form oval surfaces that present flat faces toward the back of a phone. Protrusions can be disposed adjacent one another (in an ordered array, for example). Protrusions can be disposed on the inner portions of the left and right side wall. In some embodiments, at least sixty protrusions can be disposed on an inner portion of the back wall as a collection of protrusion rows. Such protrusions can provide the shock absorbing characteristics at least along a length, a width, and/or a diagonal axis of the cover.

In some embodiments, a cover for a region of a mobile phone can have back and side (left, right, bottom and top) walls and be capable of housing a smart phone or other device. It can also have one or more protrusions disposed on an inside portion of the left side wall and on an inside portion of the right side wall. These protrusions can reduce the contact surface between the cover and the mobile phone and provide shock absorbing characteristics when the cover is housing the mobile phone. The protrusions can be formed (e.g., molded) in an X shape. There can be thirteen protrusions, each forming a row on an inner portion of a left side wall. Similar protrusions can form a column inside a right side wall.

In some embodiments, a cover for a mobile phone can have back and side (left, right, bottom and top) walls and be capable of housing a smart phone or other device. One or more protrusions can be arranged on an outer portion of the back wall of the cover and provide shock absorbing characteristics when the cover is housing the mobile phone. Protrusions can be disposed on one or more corners of the cover. These protrusions can be abruptly elevated from a wall of the plurality of walls (e.g., by a single step). These protrusions can be elevated from a wall of the plurality of walls more gradually (e.g., by two steps). Each of four corners of a cover can have a protrusion (e.g., four protruding resilient bumpers). One or more of these can be formed from flexible plastic and/or rubberized materials. Protrusions can provide shock absorbing characteristics at least along a length, width, and/or diagonal axis of the cover.

In some embodiments, a protective phone case can comprise a base envelope configured to generally surround the back and sides of a smart phone, the envelope having a back wall and four side walls. A lip of the base envelope can extend from each of the four side walls to slightly around the front of and toward a touchscreen of the smartphone. An array of protruding features arranged inside the base envelope can be configured to face and contact the back wall of the smart phone, the protruding features having spaces therebetween, the spaces forming a collective contiguous space configured to allow water to freely pass therethrough. The phone case can also have at least one row of protruding features arranged inside the base envelope along an inner-facing side wall and configured to protrude to the same extent as each other from the side wall to touch the side of a smart phone and maintain resilient contact therewith while creating air pockets therebetween, the air pockets also configured to be positioned adjacent the sidewall of the smart phone. Such a case can further comprise enlarged corner bumpers, integrally formed with the protective phone case. The protective phone case can have an elongate thickened spine that extends along more than half the length of the back of the phone case. This spine can be configured to fill the role of a shank that resiliently resists torsion of the case. The spine can have a thickness comparable to a thickness of the enlarged corner bumpers and be integrally formed therewith.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Embodiments of this disclosure will now be described through non-limiting examples, with reference to the accompanying drawings.

Figure 1:
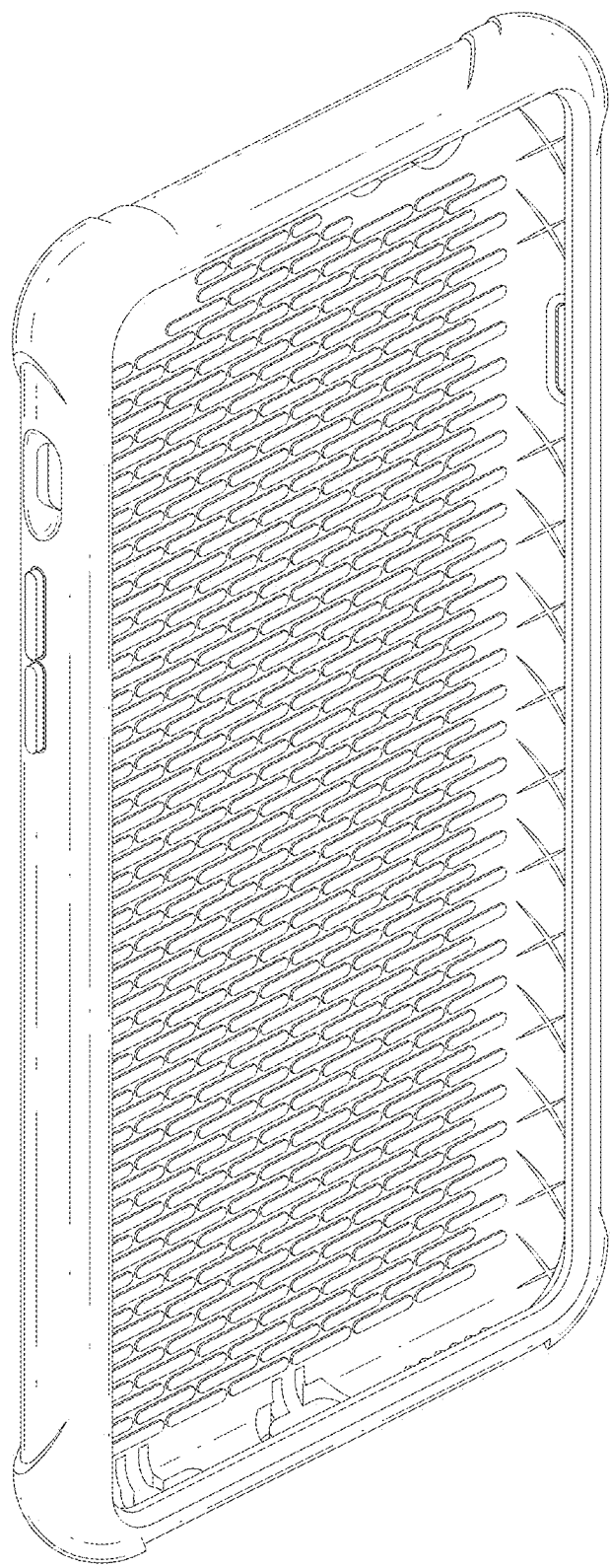
FIG. 1 is a front perspective view of one embodiment of a cover for a region of a mobile phone.

The broken lines in the drawings are for illustrative purposes only and form no part of the claimed design.

Figure 22:
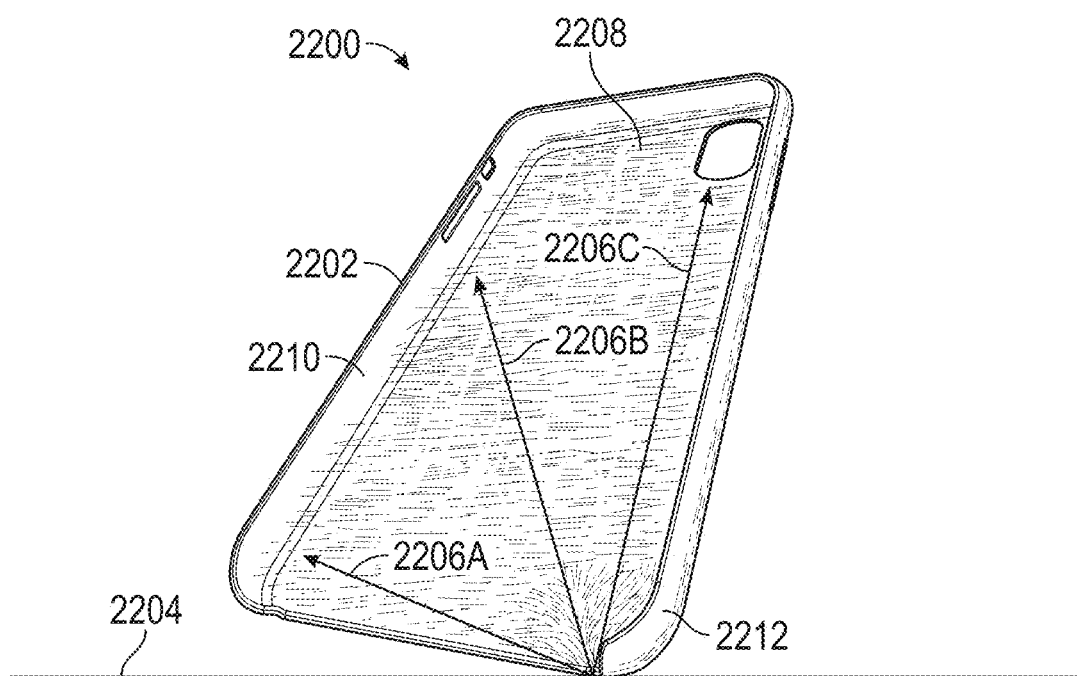

FIG. 22 illustrates an example of a mobile phone cover according to the prior art.

Figure 23A:
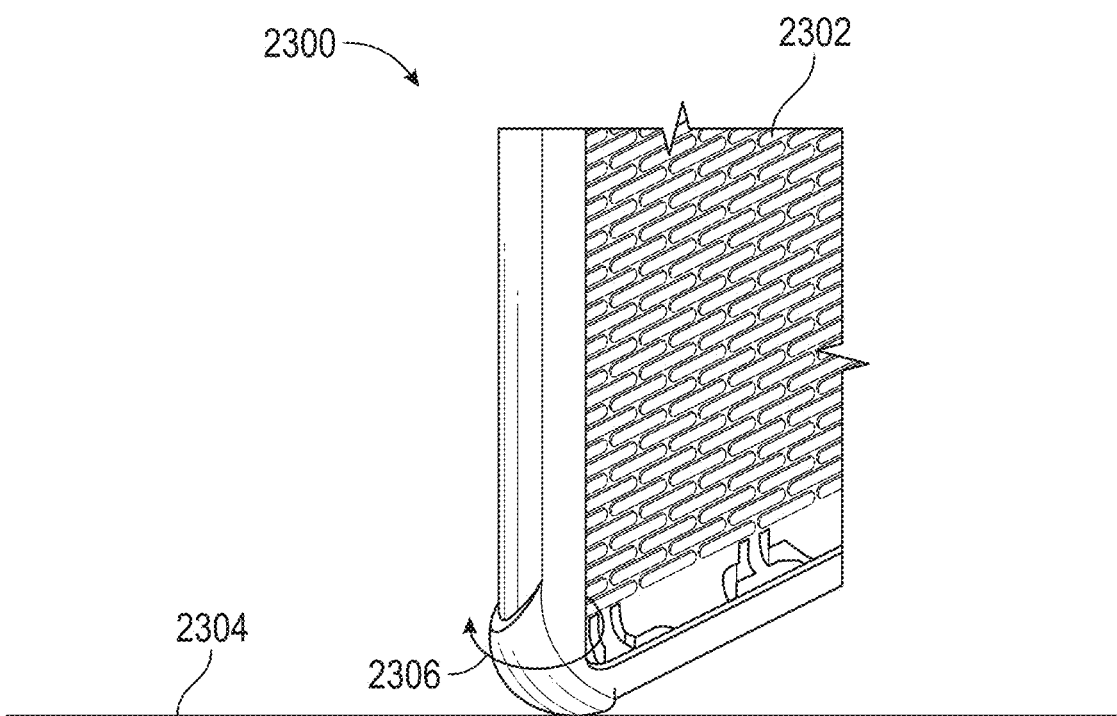
Figure 23B:
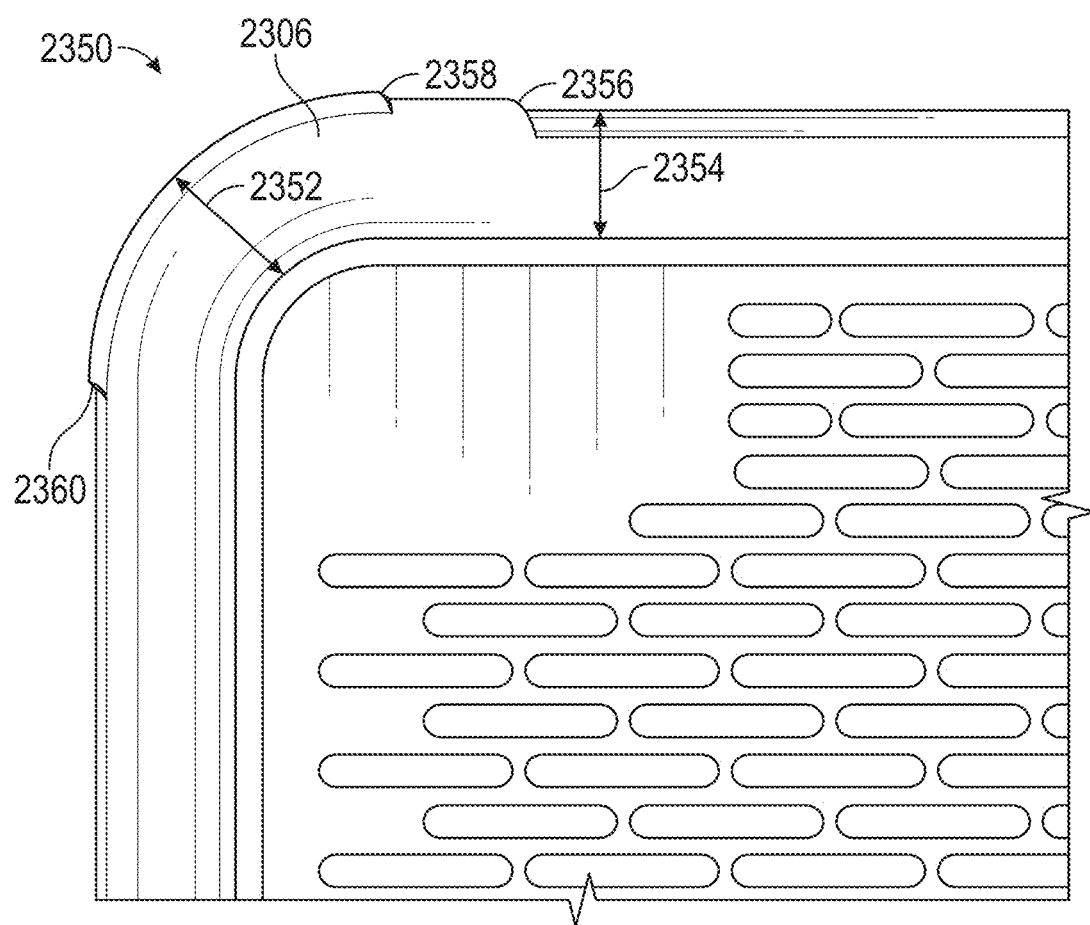

FIGS. 23A and 23B illustrate examples of a mobile phone cover with a thicker corner, according to some embodiments.

Figure 24A:
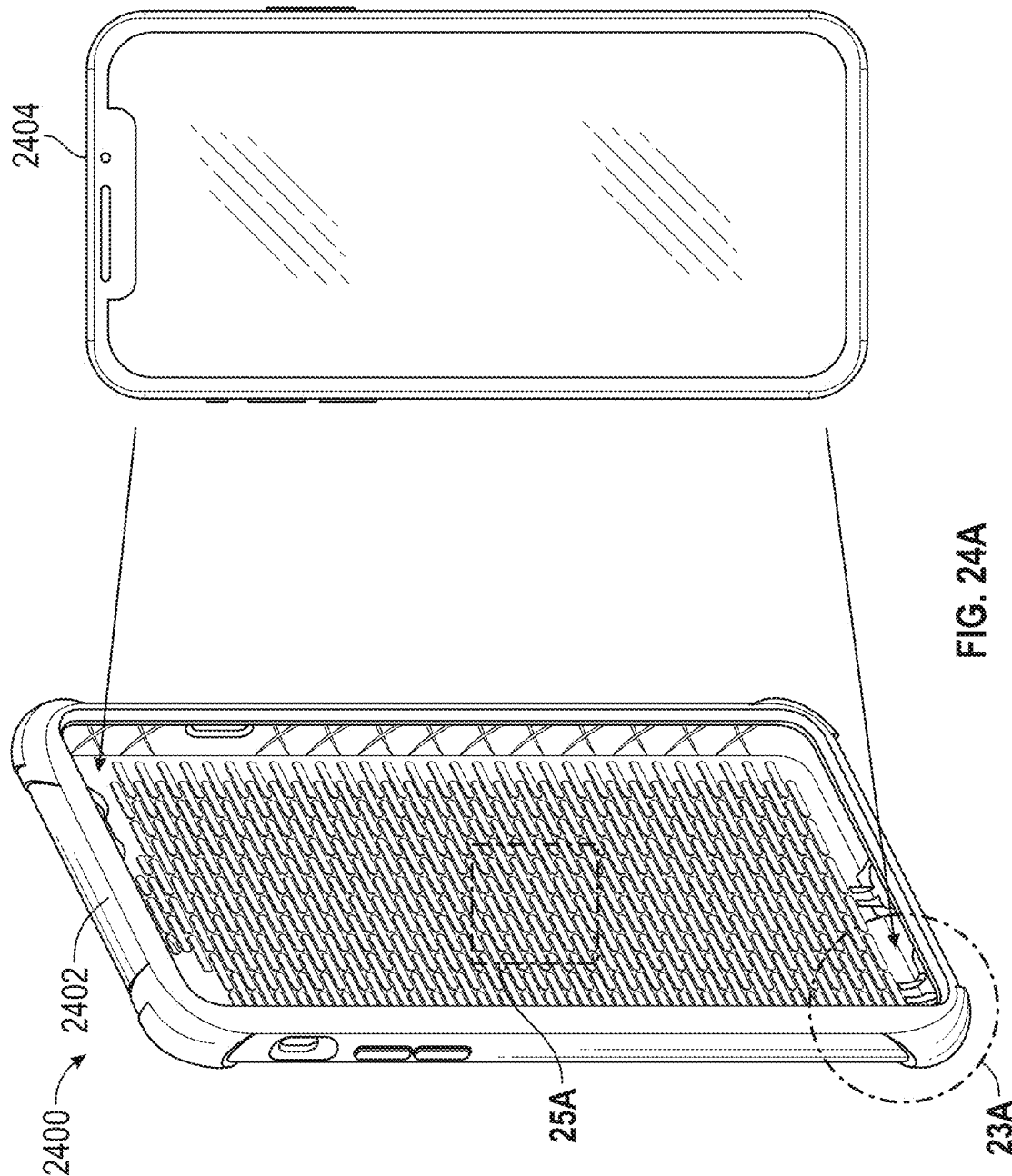

FIG. 24A illustrates an example of a mobile phone to be inserted into a mobile phone cover, according to some embodiments.

Figure 24B:
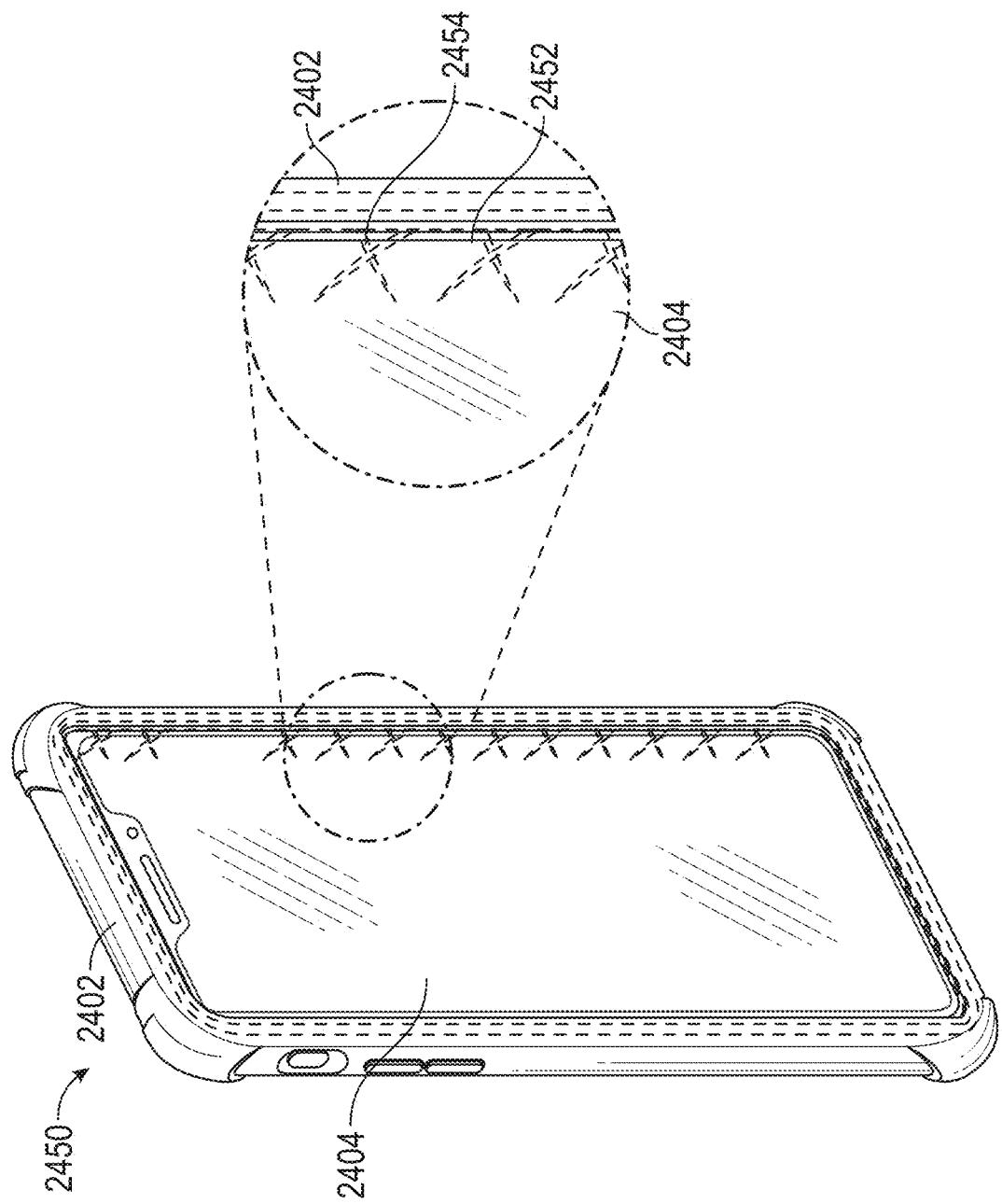

FIG. 24B illustrates an example of a mobile phone inserted into a mobile phone cover, according to some embodiments.

Figure 25A:
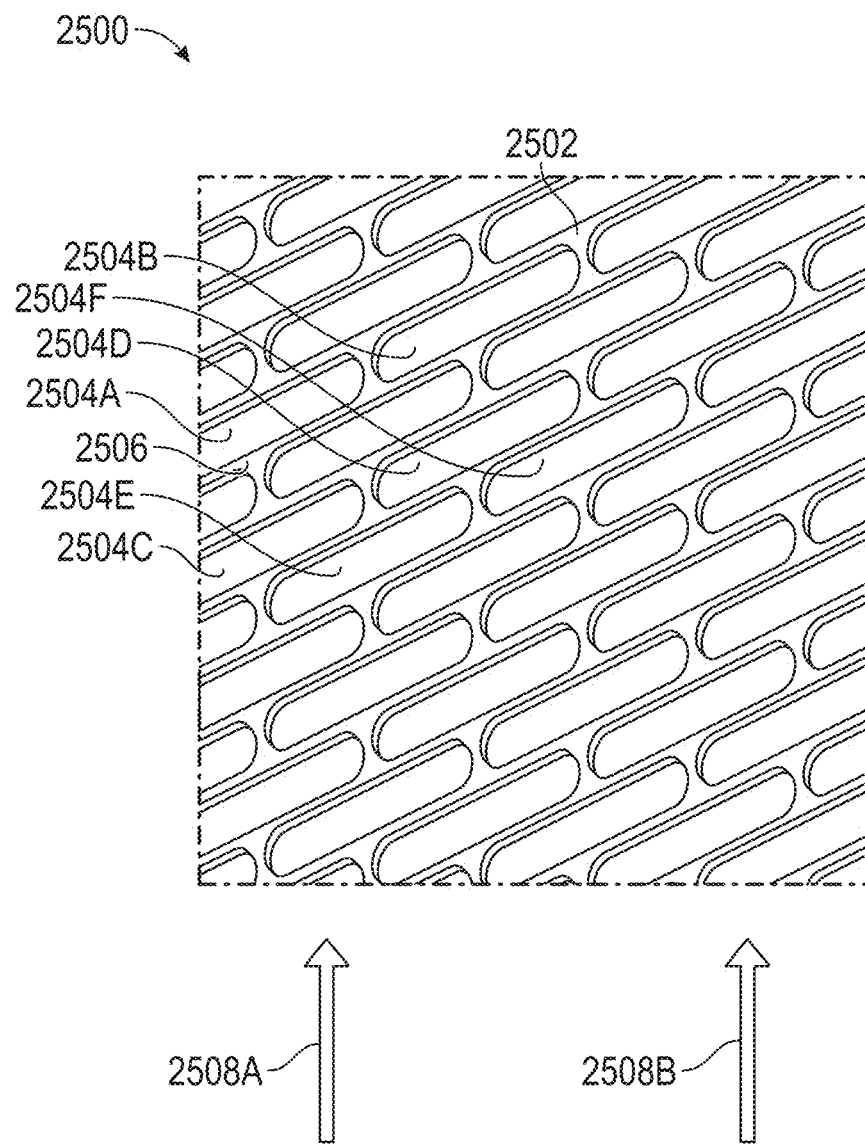

FIG. 25A illustrates an example of protrusions on the inside portion of a back wall for the mobile phone cover, according to some embodiments.

Figure 25B:
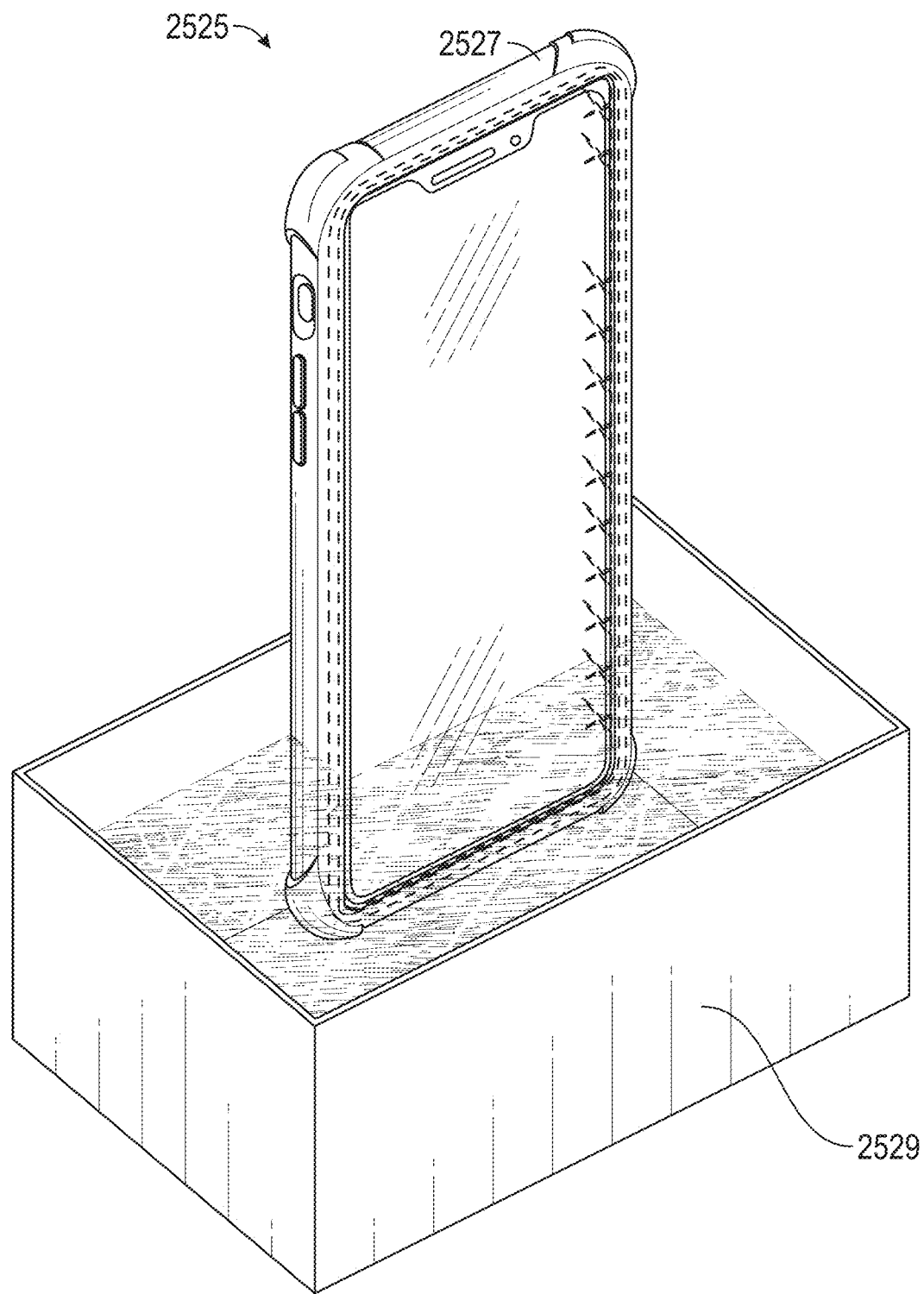

FIG. 25B illustrates an example of a mobile phone with the mobile phone cover dropped into water, according to some embodiments.

Figure 25C:
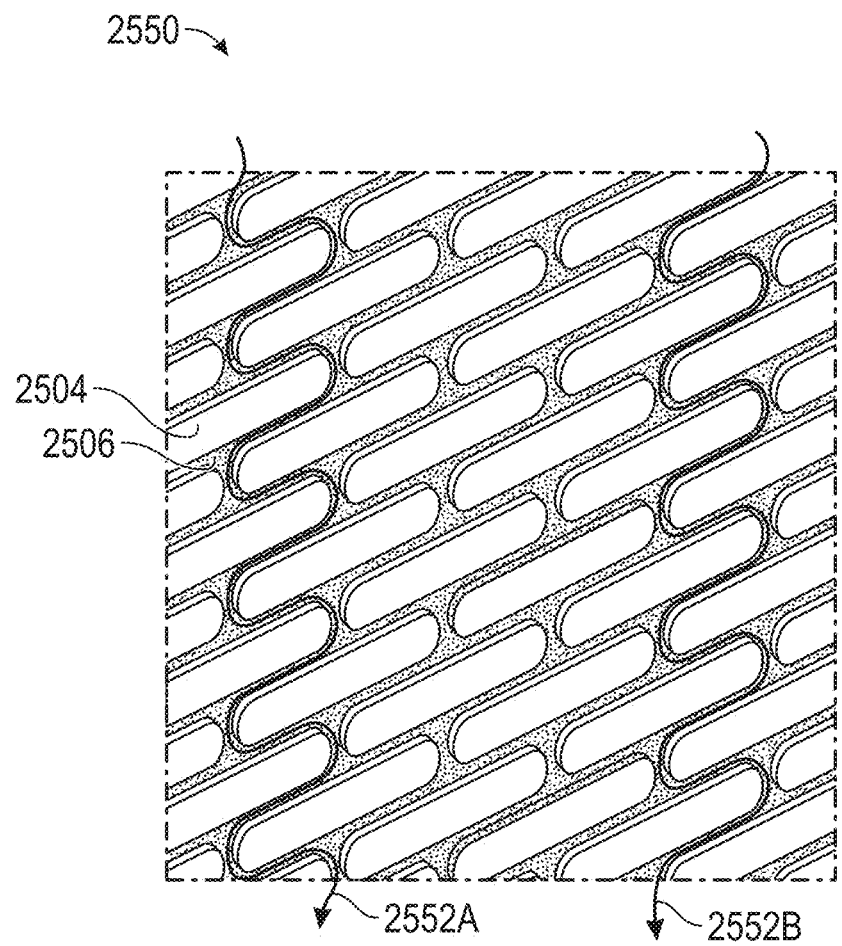

FIG. 25C illustrates an example of water flowing through the air pockets of the back wall of the mobile phone cover, according to some embodiments.

Figure 25D:
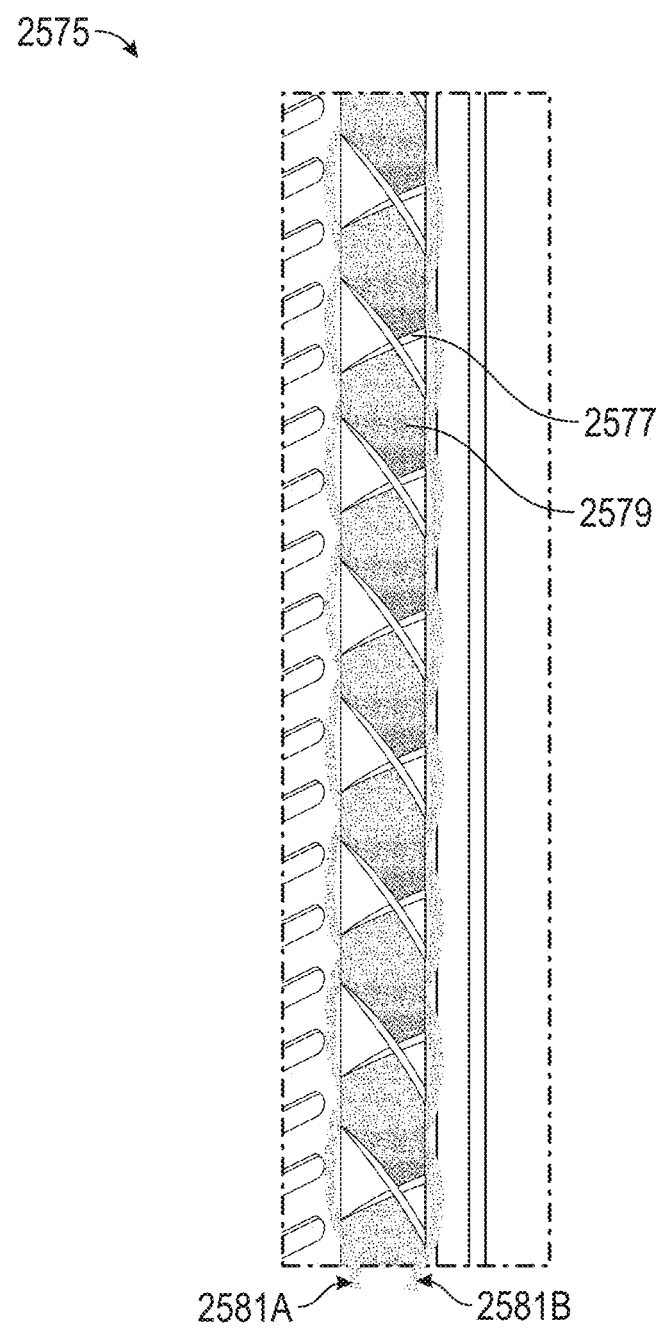

FIG. 25D illustrates an example of water flowing through the air pockets of the sidewall of the mobile phone cover, according to some embodiments.

Figure 26:
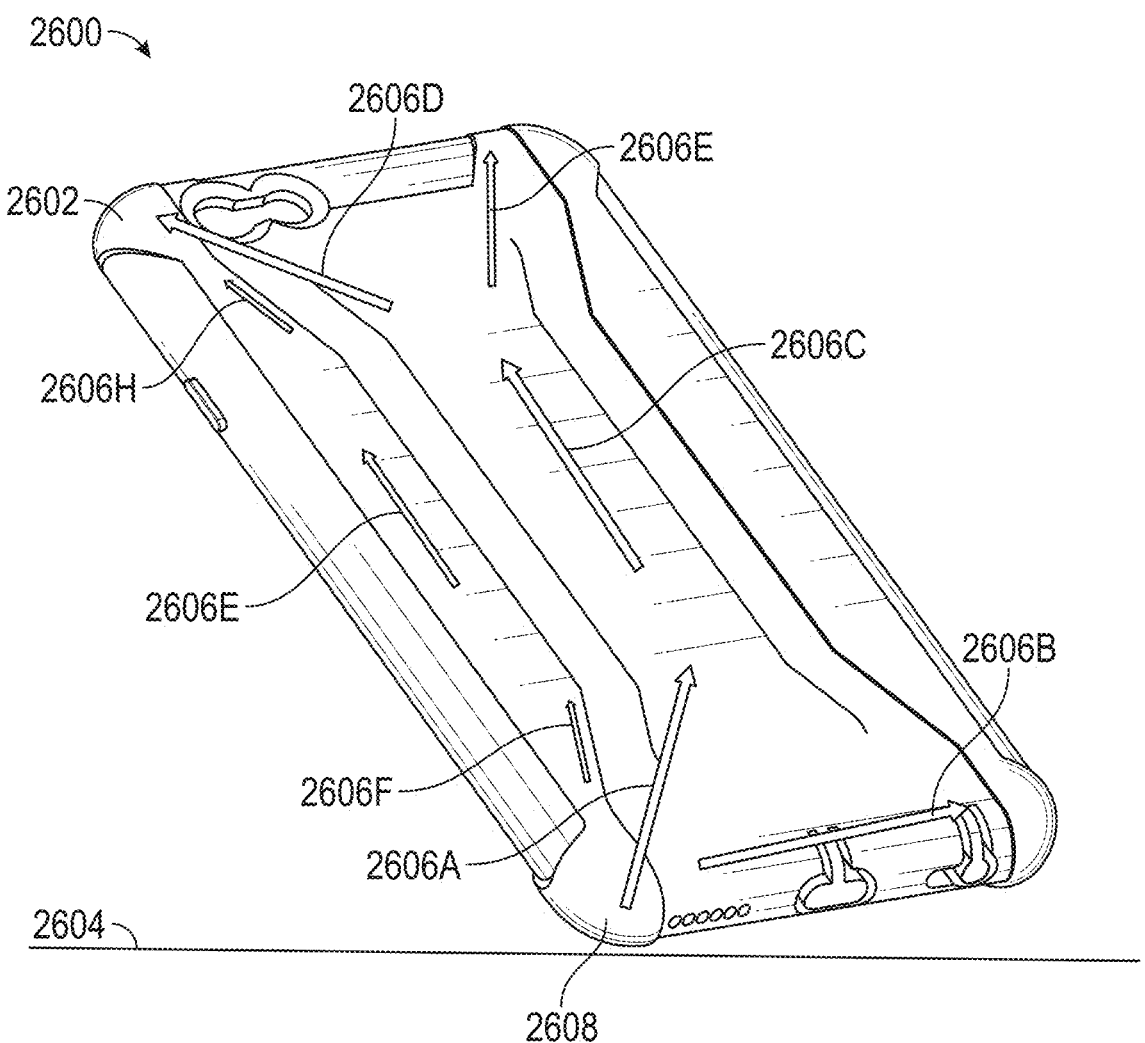

FIG. 26 illustrates an example of a mobile phone cover with protrusions on the outer portion of a back wall according to some embodiments.

Figure 27:
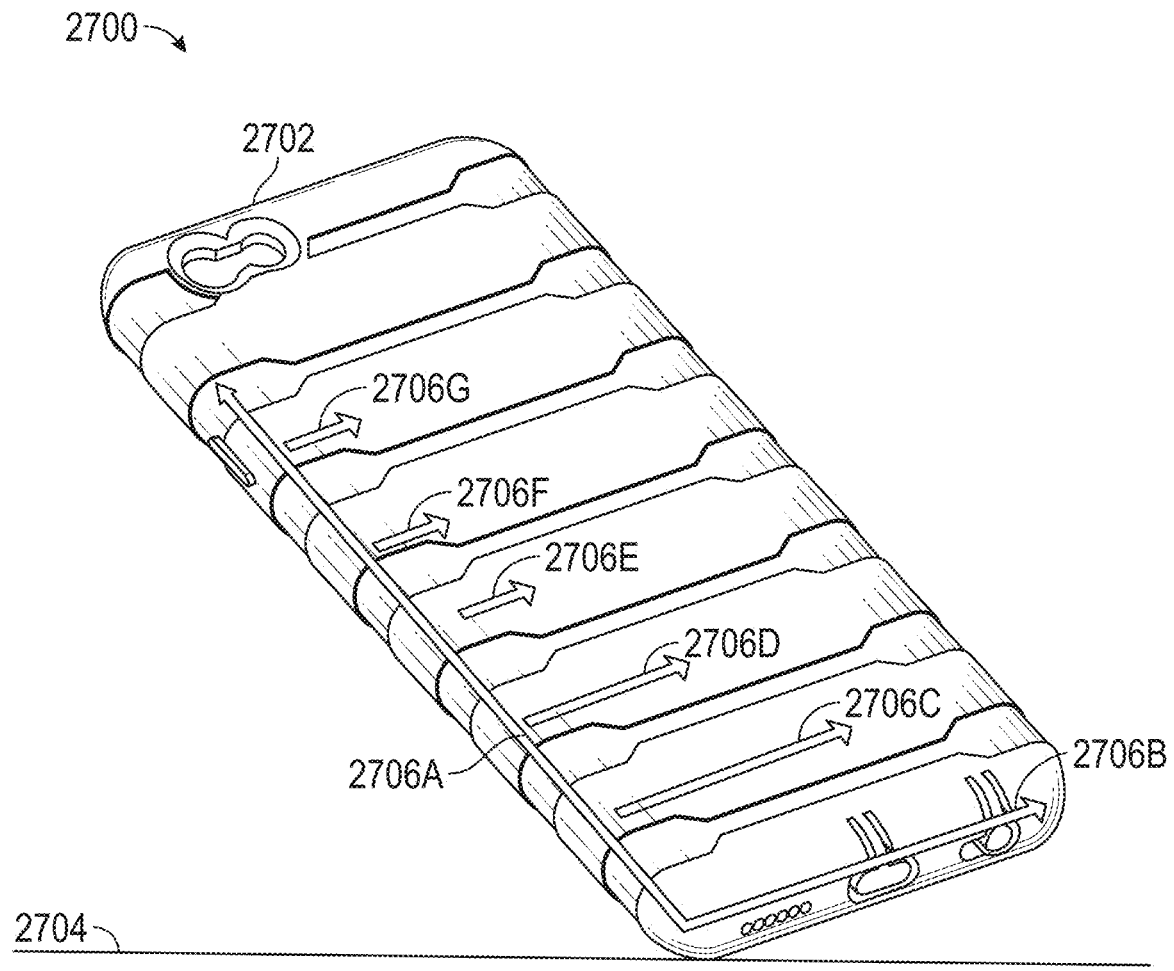

FIG. 27 illustrates an example of a mobile phone cover with protrusions on the outer portion of a back wall according to some embodiments.

Figure 28:
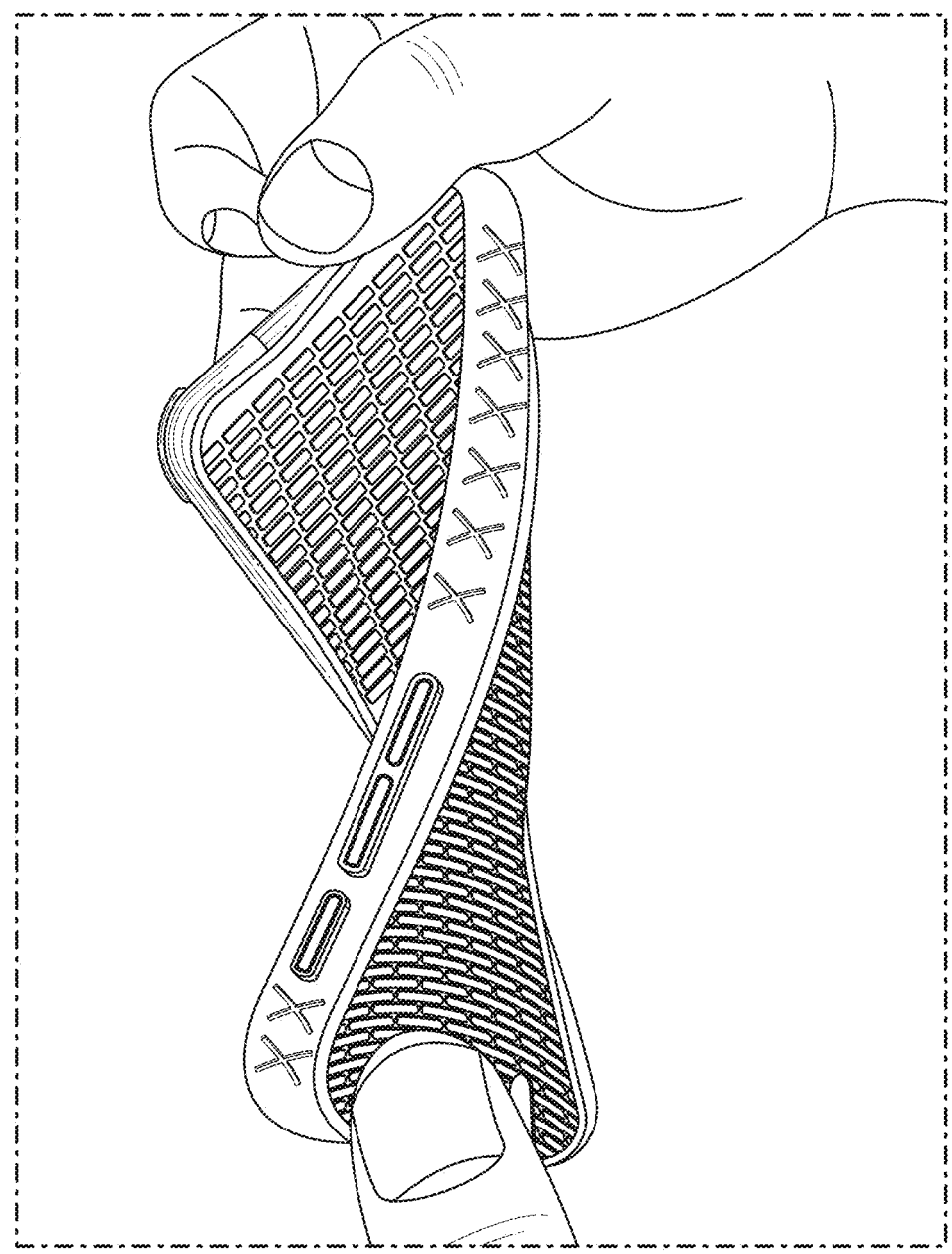

FIG. 28 illustrates an example of a mobile phone cover that can be twisted as shown.

DETAILED DESCRIPTION

The following detailed description of certain embodiments presents various descriptions of specific embodiments. However, the innovations described herein can be embodied in a multitude of different ways, for example, as defined and covered by the claims. This description refers to the drawings where like reference numerals can indicate identical or functionally similar elements. Elements illustrated in the figures are not necessarily drawn to scale. Certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

In some embodiments, a cover for a mobile phone is disclosed. The cover can cover at least a portion of the mobile phone. The cover can include aspects that protect the phone from impact and/or provide shock absorbance characteristics. One or more aspects of the cover can be included on the cover to provide such impact protection and/or provide shock absorbance characteristics. A plurality of aspects that provide impact protection and/or provide shock absorbance characteristics can advantageously compound in effect and/or complement one another.

Figure 2:
FIG. 2 is a back perspective view of one embodiment of the cover for the region of the mobile phone of FIG. 1.
Figure 3:
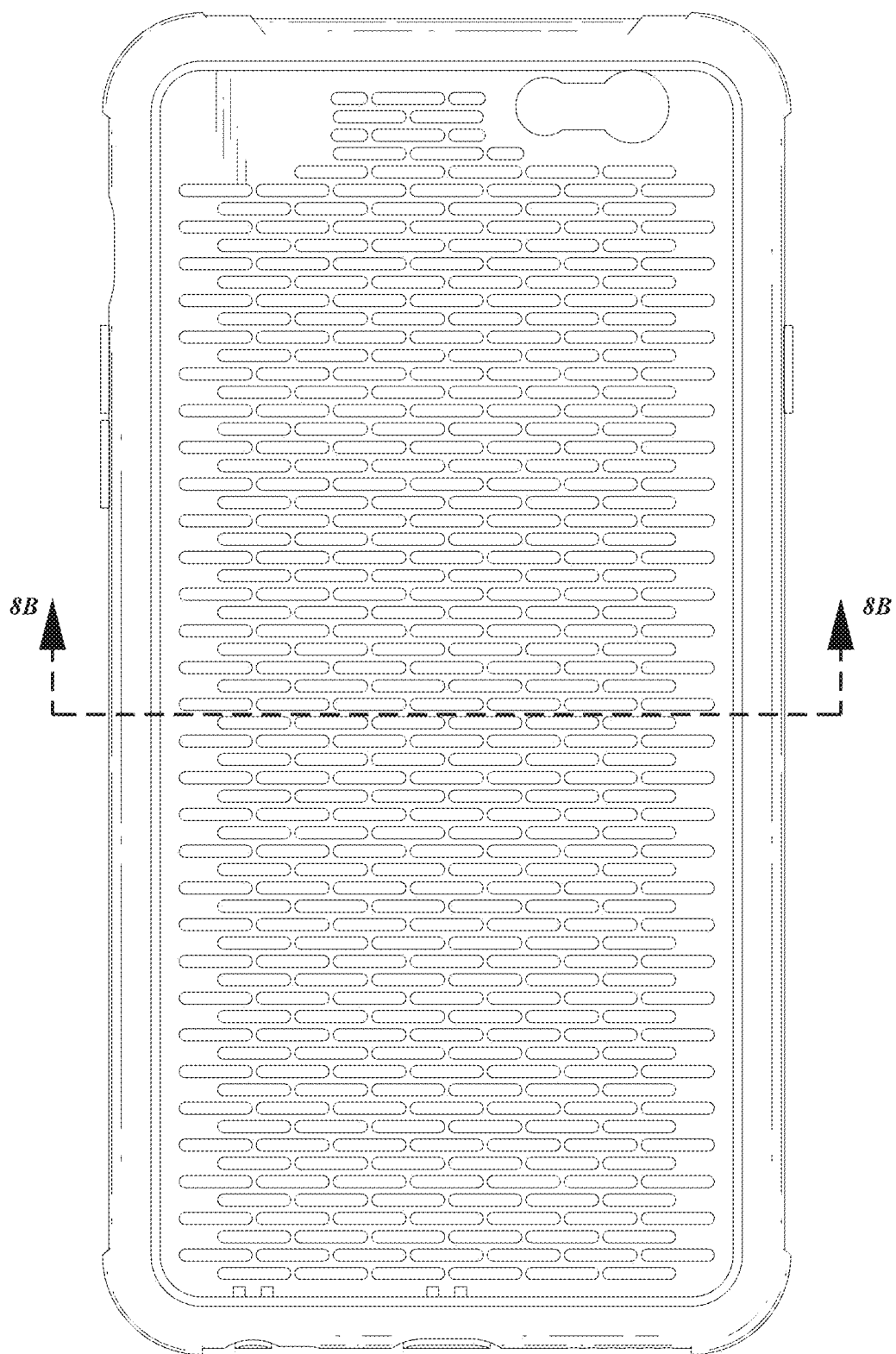
FIG. 3 is a front view of the cover for the region of the mobile phone of FIG. 1.
Figure 4:
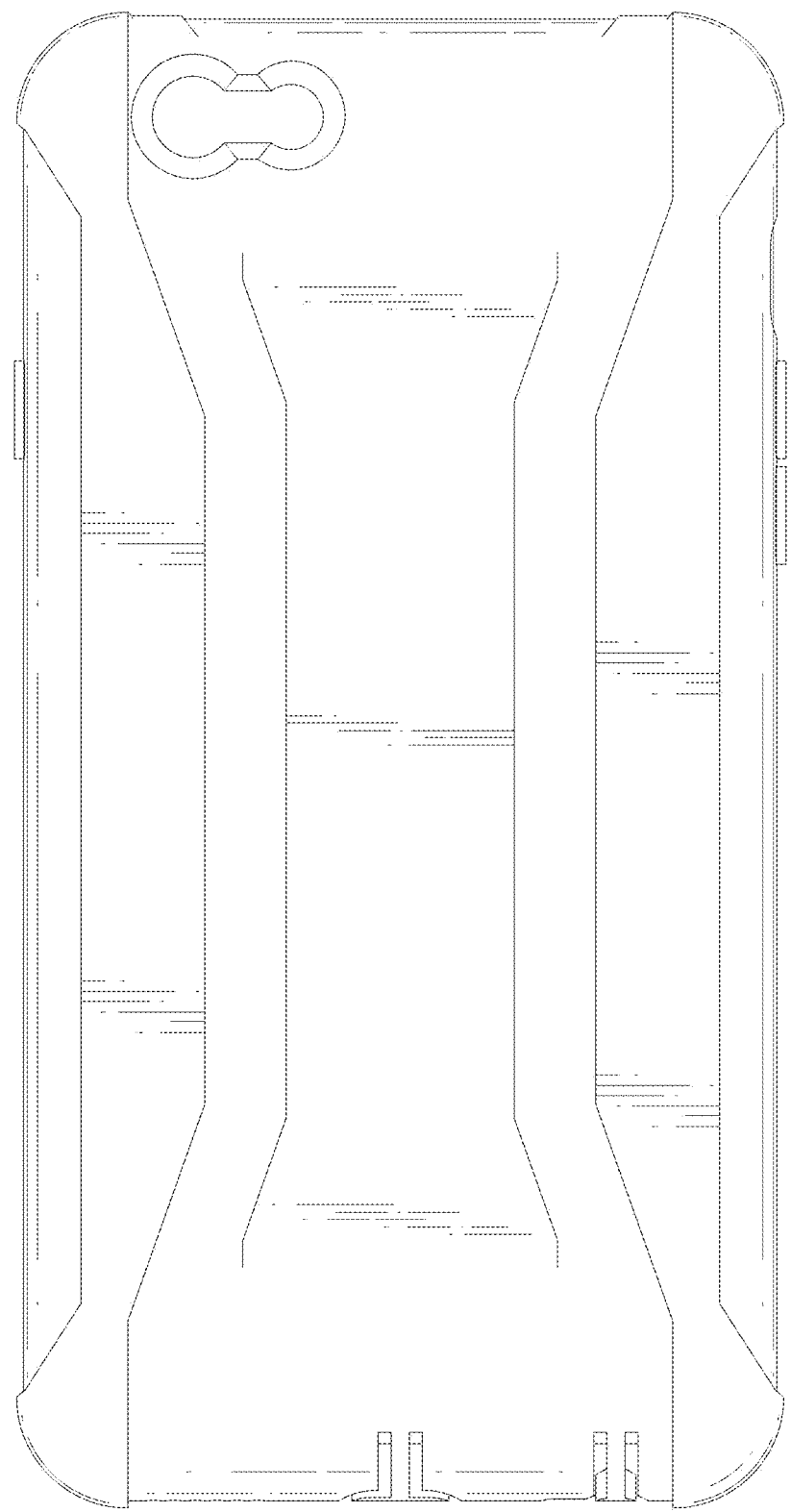
FIG. 4 is a back view of the cover for the region of the mobile phone of FIG. 1.
Figure 5:
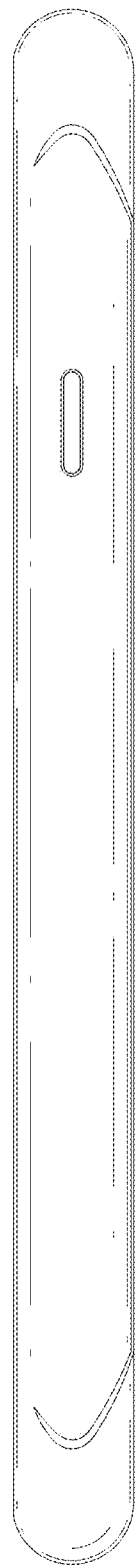
FIG. 5 is a right side view of the cover for the region of the mobile phone of FIG. 1.
Figure 6:
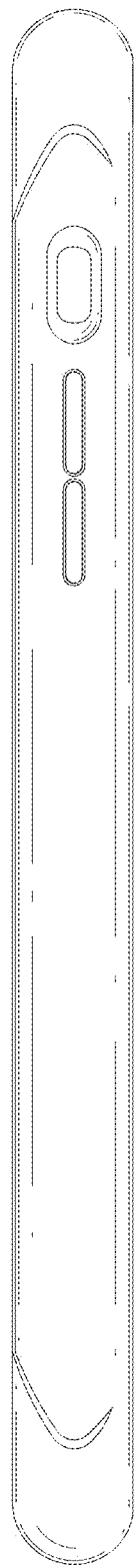
FIG. 6 is a left side view of the cover for the region of the mobile phone of FIG. 1.
Figure 7:
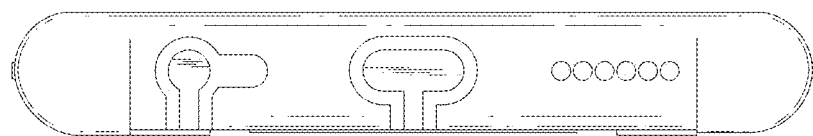
FIG. 7 is a bottom view of the cover for the region of the mobile phone of FIG. 1.
Figure 8A:
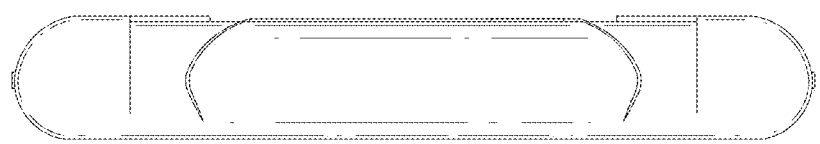
FIG. 8A is a top view of the cover for the region of the mobile phone of FIG. 1.
Figure 8B:
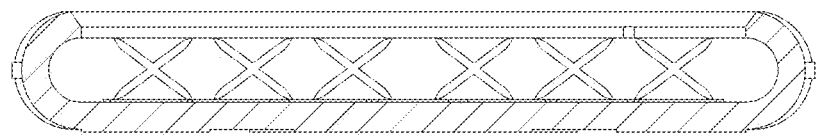
FIG. 8B is a cross-section of the cover for the region of the mobile phone of FIG. 1.

FIG. 1 is a front perspective view of one embodiment of a cover for a region of a mobile phone. FIG. 2 is a back perspective view of one embodiment of the cover for the region of the mobile phone of FIG. 1. FIG. 3 is a front view of the cover for the region of the mobile phone of FIG. 1. FIG. 4 is a back view of the cover for the region of the mobile phone of FIG. 1. FIG. 5 is a right side view of the cover for the region of the mobile phone of FIG. 1. FIG. 6 is a left side view of the cover for the region of the mobile phone of FIG. 1. FIG. 7 is a bottom view of the cover for the region of the mobile phone of FIG. 1. FIG. 8A is a top view of the cover for the region of the mobile phone of FIG. 1. FIG. 8B is a cross-section of the cover for the region of the mobile phone of FIG. 1.

Figure 9A:
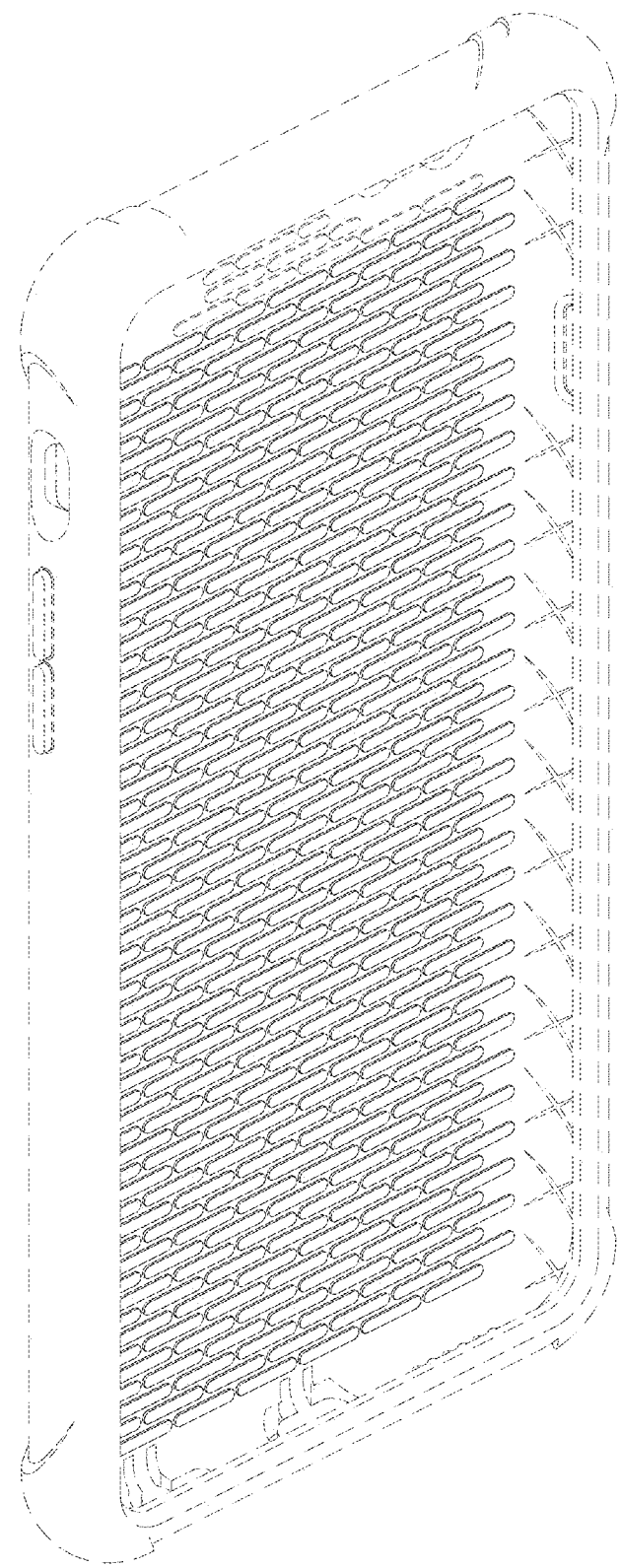
FIG. 9A is a perspective view of the padded shock absorber on one side of the cover for the region of the mobile phone of FIG. 1.
Figure 9B:
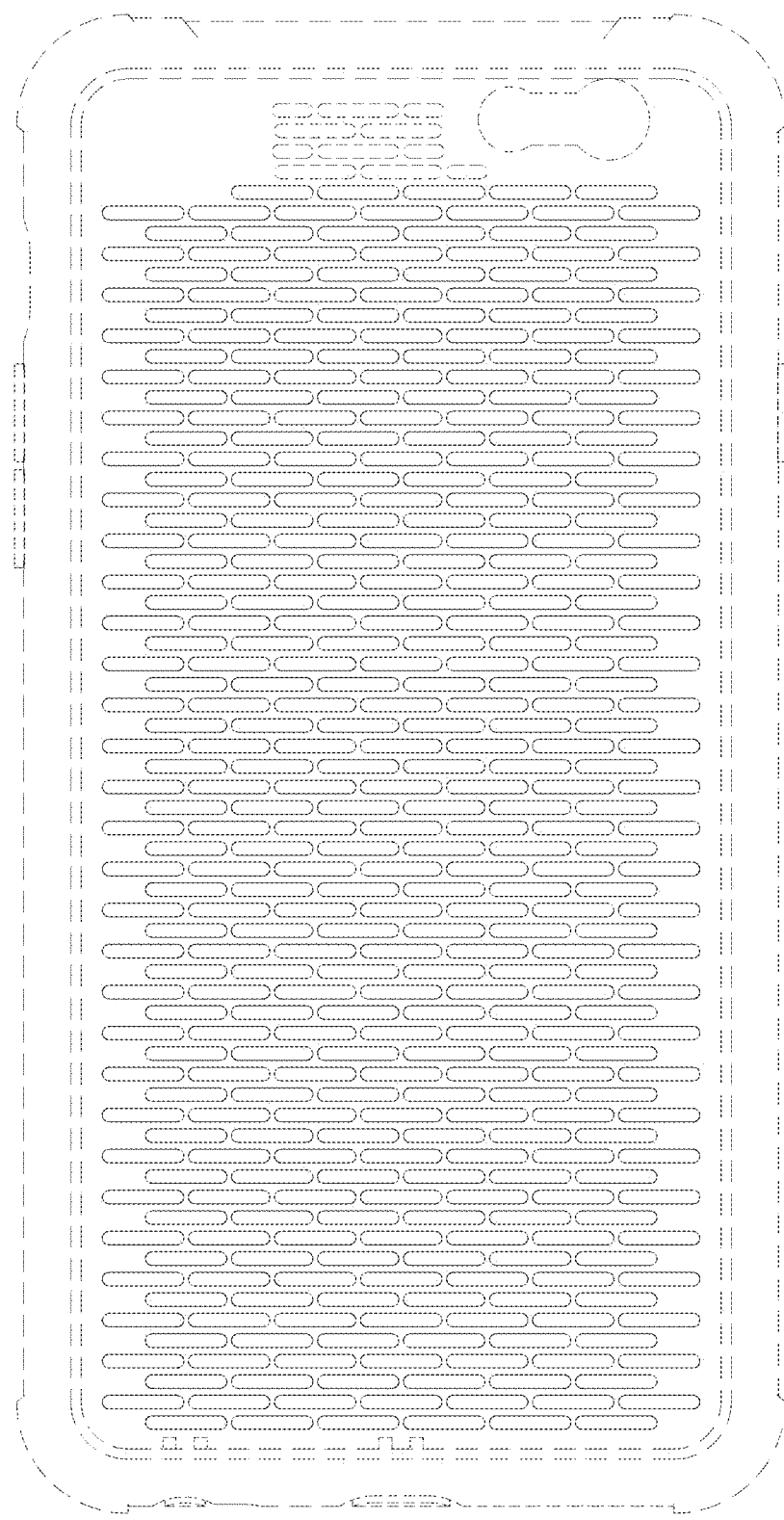
FIG. 9B is a front view of the padded shock absorber on one side of the cover for the region of the mobile phone of FIG. 9A.
Figure 9C:
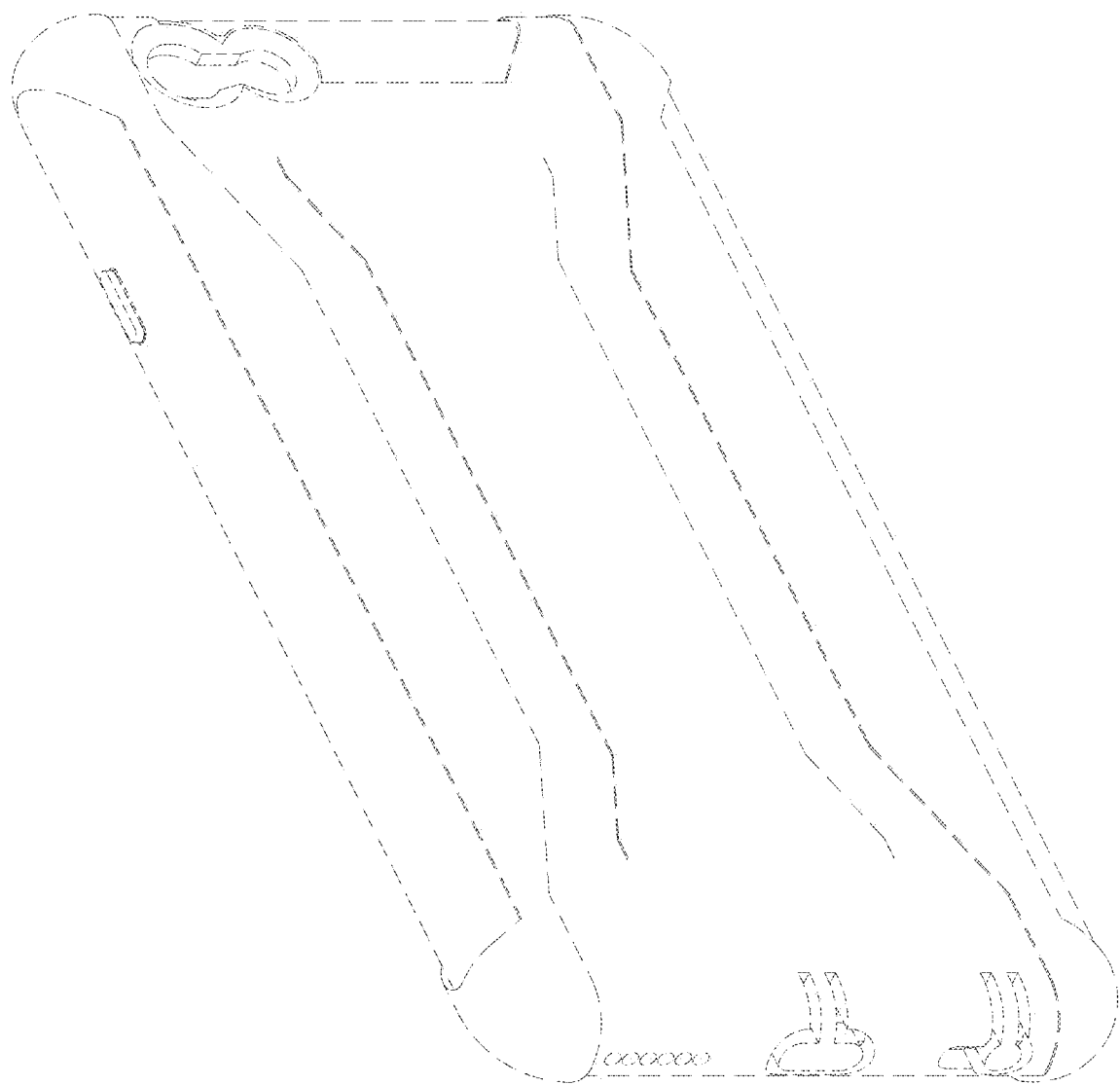
FIG. 9C is a back view of the padded shock absorber on one side of the cover for the region of the mobile phone of FIG. 9A.

In some embodiments, the cover for the region of the mobile phone can include one or more protrusions that are configured to contact the back flat surface of a mobile phone. FIG. 9A is a perspective view showing how an array of such protrusions can form an aspect of a mobile phone cover. FIG. 9B is a front plan view of this same array of FIG. 9A. FIG. 9C is a back view of the same embodiment. The lines are dashed to indicate that the features visible in FIG. 9C do not form part of the protrusion array of FIG. 9A. Separate contours and protrusions are shown here, each having their own role to play in the overall design (functionally and/or aesthetically).

The cover can include one or more protrusions with reduced phone contact surface. Advantageously, the one or more protrusions provide shock absorbing characteristics by reducing the contact surface between the cover and the phone. The shock and/or impact on a cover may be reduced because it is transferred less directly or transferred differently to the mobile phone. For example, upon impact, protrusions (which are connected with other protrusions by a back surface) can flex into the spaces between the protrusions, thereby dissipating force from the impact without transferring it to the phone itself. These protrusions can form an array of evenly-spaced elongate ovals that together form a flat surface because they protrude to the same extent, each having a smooth flat surface in the same plane and configured to contact (periodically) the smooth back portion of a phone.

In some embodiments, the one or more protrusions include a circular, semi-circular, oval, semi-oval, square, semi-square, triangular, semi-triangular, rectangular, semi-rectangular shape and the like. In the example of FIG. 9A, the one or more protrusions include a soft-side rectangular shape. The one or more protrusions can be flat on the top and/or bottom. The one or more protrusions can be of semi-circular shape on the left and/or the right.

In some embodiments, the one or more protrusions can be placed at least partially adjacent to another protrusion. For example, seven protrusions can be placed adjacent to one another to form a row of protrusions and/or seven columns of protrusions. In some embodiments, the one or more protrusions can be placed at least partially vertically above another protrusion in the view of FIG. 9B. For example, sixty protrusions can be placed at least partially above one another and partially offset to create at least sixty rows of protrusions and/or a long column of protrusions.

In some embodiments, one or more protrusions can be disposed on one or more surfaces of the cover. For example, protrusions can be placed on the inside surface of the back of the cover that can contact the back of the mobile phone when the mobile phone is placed inside of the cover. In some embodiments, protrusions can be disposed on at least a portion of the one or more surfaces. In some embodiments, protrusions can be disposed on a portion but not all of the one or more surfaces. For example, protrusions can be disposed on an inner surface of the back of the cover except near the portion of the inner surface that is adjacent to the camera of the mobile phone.

Figure 10A:
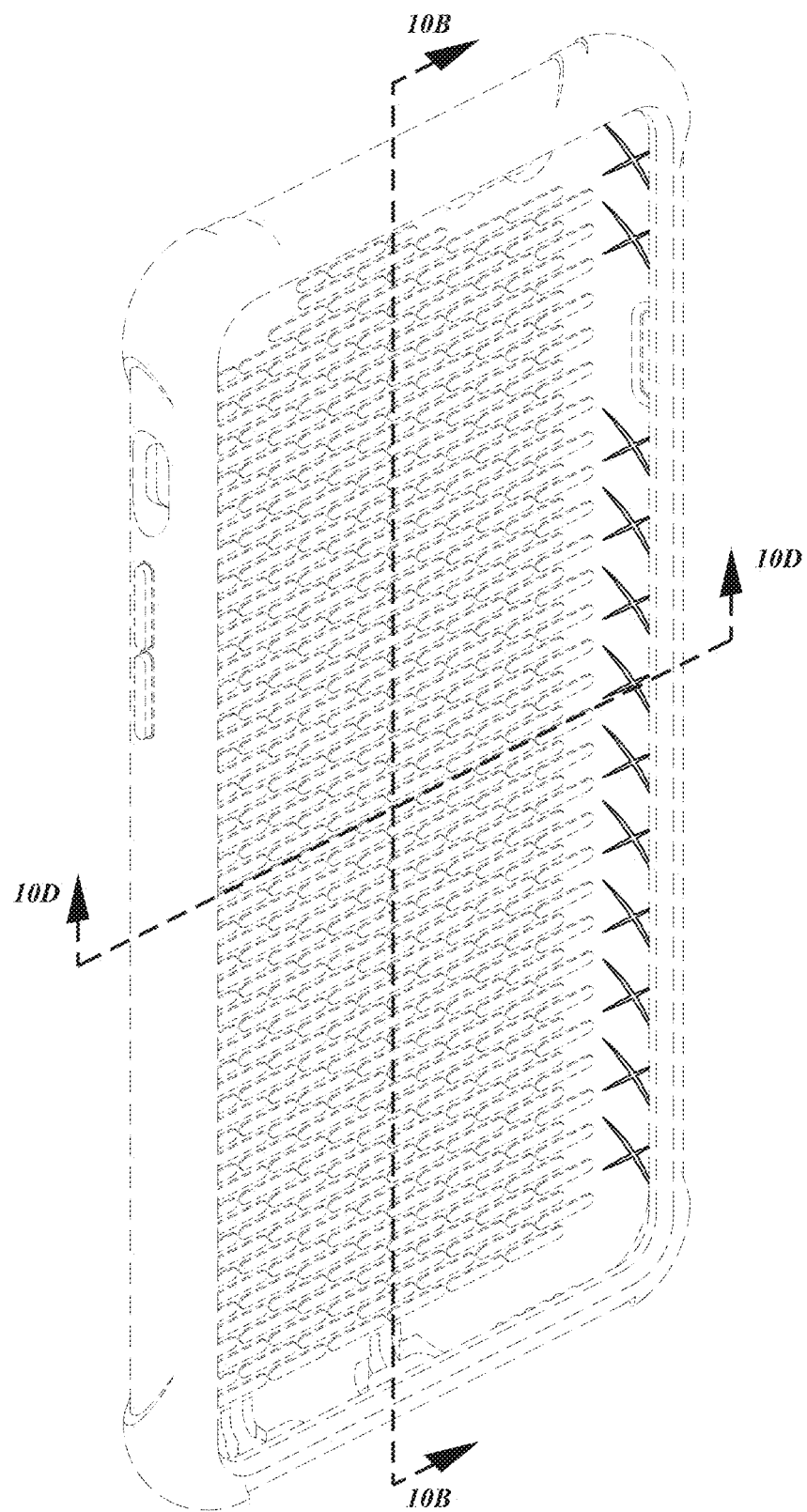
FIG. 10A is a perspective view of one aspect of the cover for the region of the mobile phone of FIG. 1.
Figure 10B:
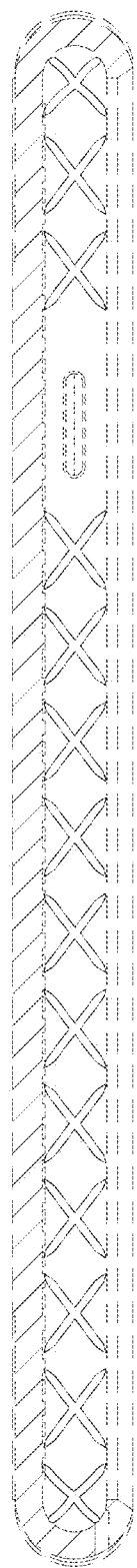
FIG. 10B is a front view of the one aspect for the region of the mobile phone of FIG. 10A.
Figure 10C:
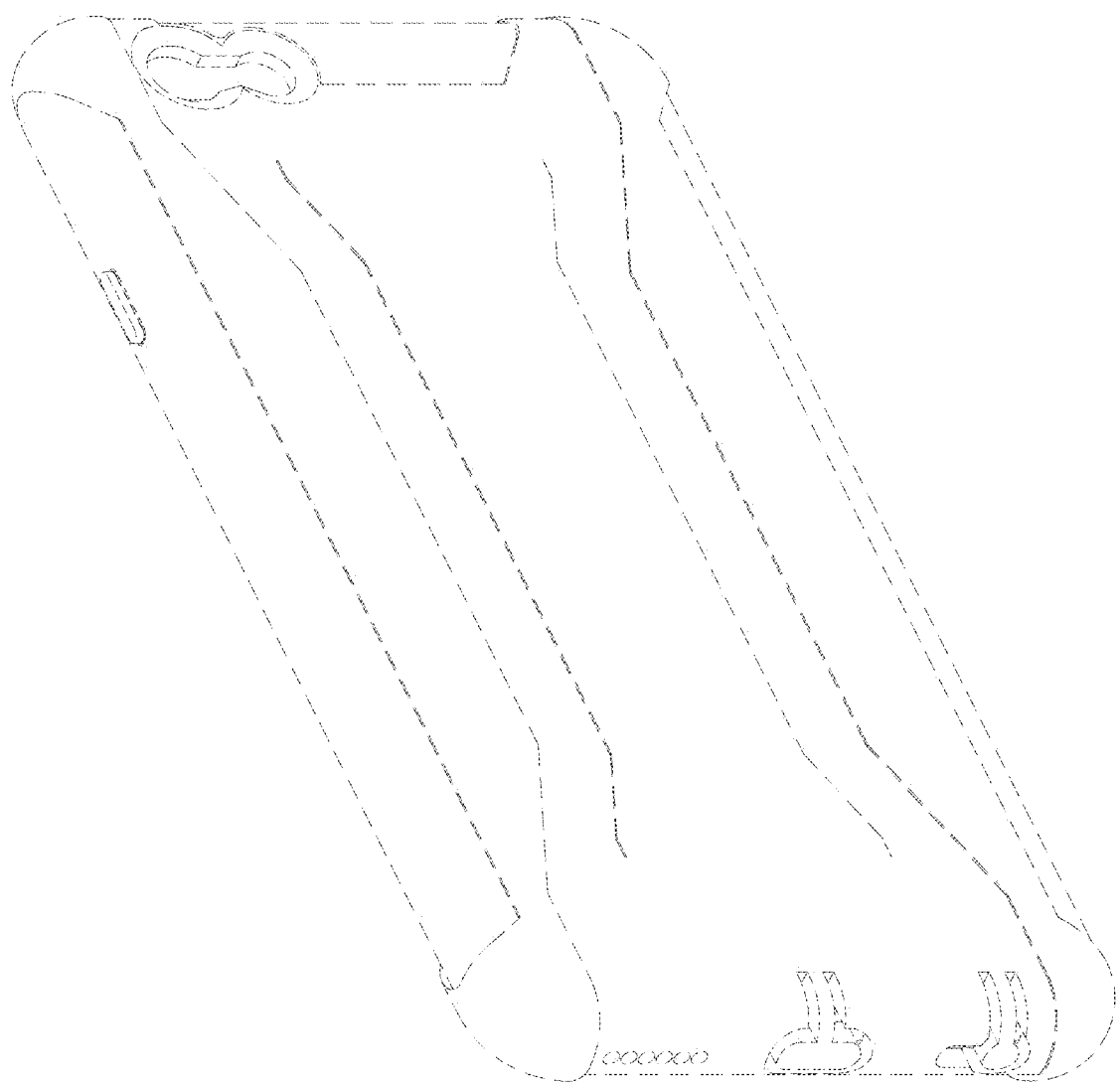
FIG. 10C is a back view of the one aspect for the region of the mobile phone of FIG. 10A.
Figure 10D:
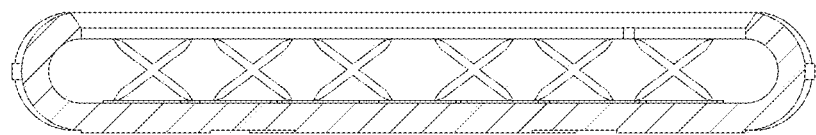
FIG. 10D is a cross-section of the another aspect for the region of the mobile phone of FIG. 10A.

In some embodiments, protrusions can include protrusions of varying shapes, including the shape of an x-mark. Examples of such shapes are shown in FIG. 1, and FIG. 8B. However such shapes are emphasized further in FIGS. 10A, 10B, and 10D. FIG. 10A is a perspective view of another aspect of a mobile phone cover. FIG. 10B shows a section taken along the line 10B-10B of FIG. 10A. FIG. 10C is a back view, where lines are dashed to indicate that the x-mark protrusions are not visible from this perspective. FIG. 10D shows a section taken along the line 10D-10D of FIG. 10A.

In some embodiments, the one or more protrusions can be arranged in a vertical column extending along the inner edge of a phone case to create a stack or column of multiple (e.g., thirteen) protrusions. In some embodiments, the protrusions are not directly aligned but may be offset or arranged differently.

In some embodiments, the one or more protrusions are placed on or integrally formed with a wall of a cover. For example, the one or more protrusions may be disposed to avoid adjacency to certain portions of where the mobile phone can be placed, such as a button, a camera, and/or other form of input/output of the mobile phone. This can allow a phone cover to be more flush with the phone itself in those regions, facilitate operation of (and avoid interference with) any buttons or function of any outward-facing features, and improve a sealing and/or gripping function thereof.

In some embodiments, the one or more protrusions can be disposed in the inside of one or more side walls (e.g. the left, the right, the bottom, and the top walls) of the cover. For example, the one or more protrusions can be disposed on the inside of the left side wall of the cover and on the inside of the right side wall of the cover.

Figure 11A:
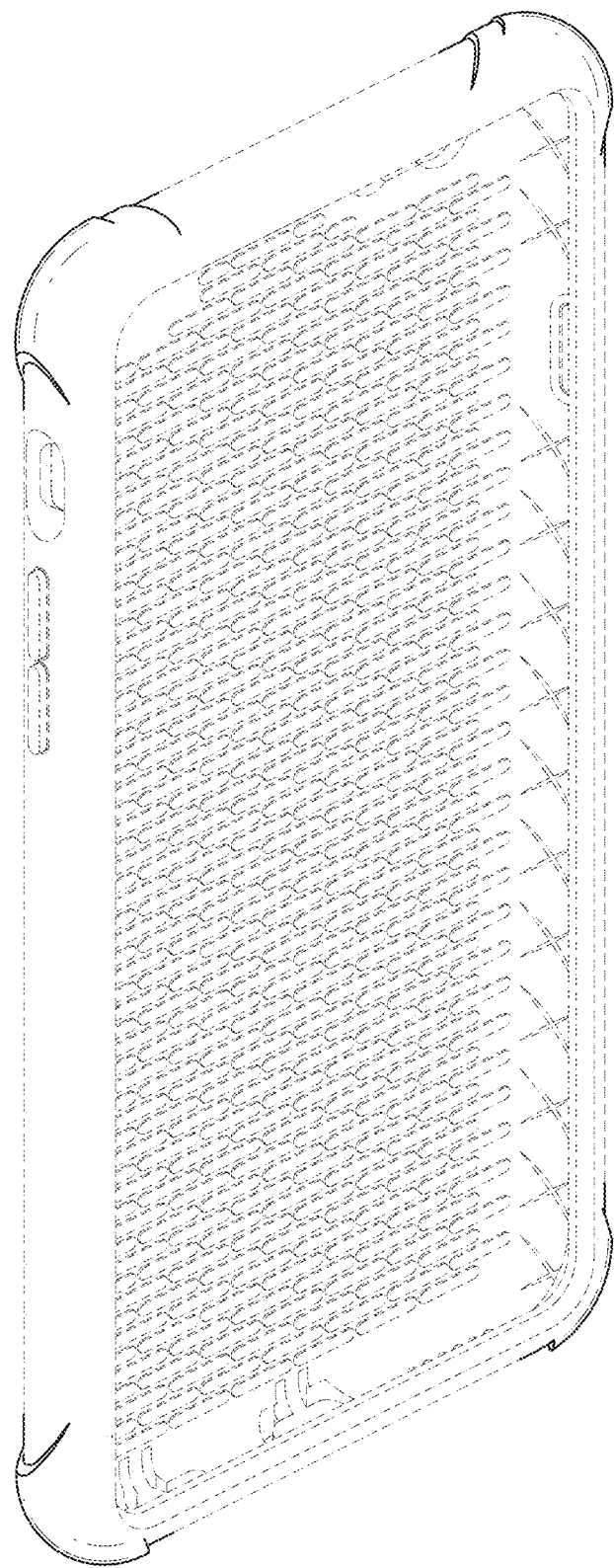
FIG. 11A is a perspective view of another aspect of the cover for the region of the mobile phone of FIG. 1.
Figure 11B:
FIG. 11B is a front view of the another aspect for the region of the mobile phone of FIG. 11A.
Figure 11C:
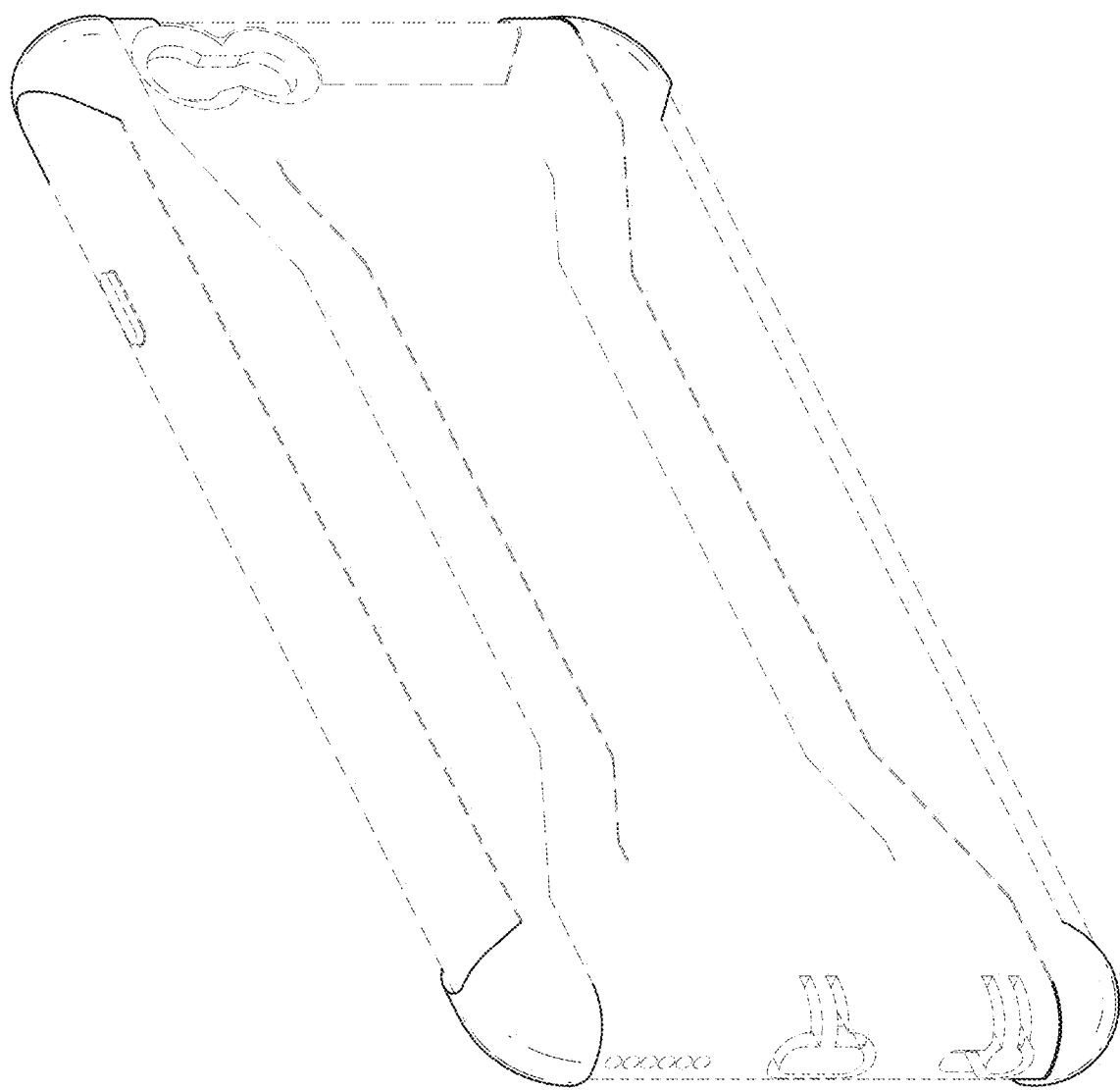
FIG. 11C is a back view of the another aspect for the region of the mobile phone of FIG. 11A.

In some embodiments, the aspects that protect the phone from impact and/or provide shock absorbance characteristics can vary and provide protection from impacts of differing speed, acceleration, location, and/or area of the impact. For example, thicker corners can provide more shock absorbance characteristics at the corners of the phone than at other less thick portions. FIG. 11A is a perspective view showing one configuration for such thicker corners. FIG. 11B is a front plan view that also shows these thicker corners of FIG. 11A. FIG. 11C is a back view, showing how these thicker corner regions wrap around to the back of the phone case in this example and dovetail with a thicker region there (shown in dashed lines).

In some embodiments, protrusions can protrude from the surface of the cover by 0.001 mm, 0.002 mm, 0.005 mm, 0.01 mm, 0.02 mm, 0.05 mm, 0.1 mm, 0.2 mm, 0.5 mm, 1 mm, 2 mm, 5 mm, 10 mm, 20 mm, 50 mm, 100 mm, 200 mm, 500 mm, a distance in between the distances mentioned, and/or the like. In some embodiments, the one or more oval (or other) shapes can instead be voids or depressions such that the space around them protrudes and they are recessed. The one or more depressions can be recessed into the surface of the cover by 0.001 mm, 0.002 mm, 0.005 mm, 0.01 mm, 0.02 mm, 0.05 mm, 0.1 mm, 0.2 mm, 0.5 mm, 1 mm, 2 mm, 5 mm, 10 mm, 20 mm, 50 mm, 100 mm, 200 mm, 500 mm, a distance in between the distances mentioned, and/or the like.

In some embodiments, one or more corners are thicker than at least a portion of the sides of the cover. For example, the four corners can be elevated from the side wall, the top wall, and/or the bottom wall of the cover. FIGS. 11A-11C show examples shapes and configurations for thicker corners.

In some embodiments, one or both sides of the corners can be elevated from a side wall by one or more steps. For example, the top left corner can be thicker than the top side of the cover and can be elevated in two steps from the top side of the cover. For example, the top side of the cover can elevate to an intermediate surface, and then elevate from the intermediate surface to the top or outer side of the cover. In some embodiments, the corners can be elevated once, without any step or intermediate layer. For example, the top left corner can be elevated once from the side wall of the cover such that a single ledge is formed between the thinner level along the sides and the outer surface at the corner, where the material is thicker.

Figure 12A:
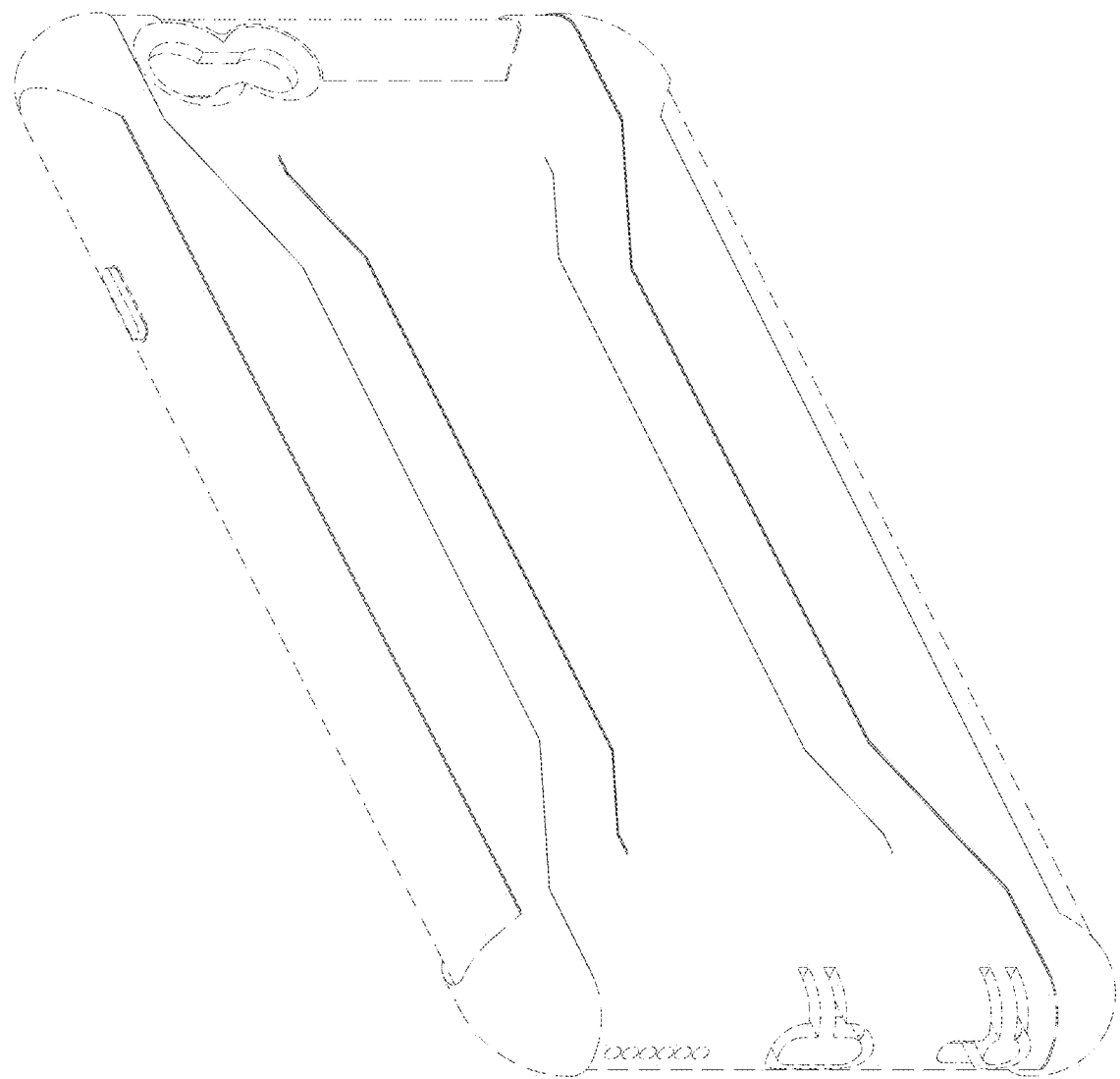
FIG. 12A is a back perspective view of another aspect of the cover for the region of the mobile phone of FIG. 1.
Figure 12B:
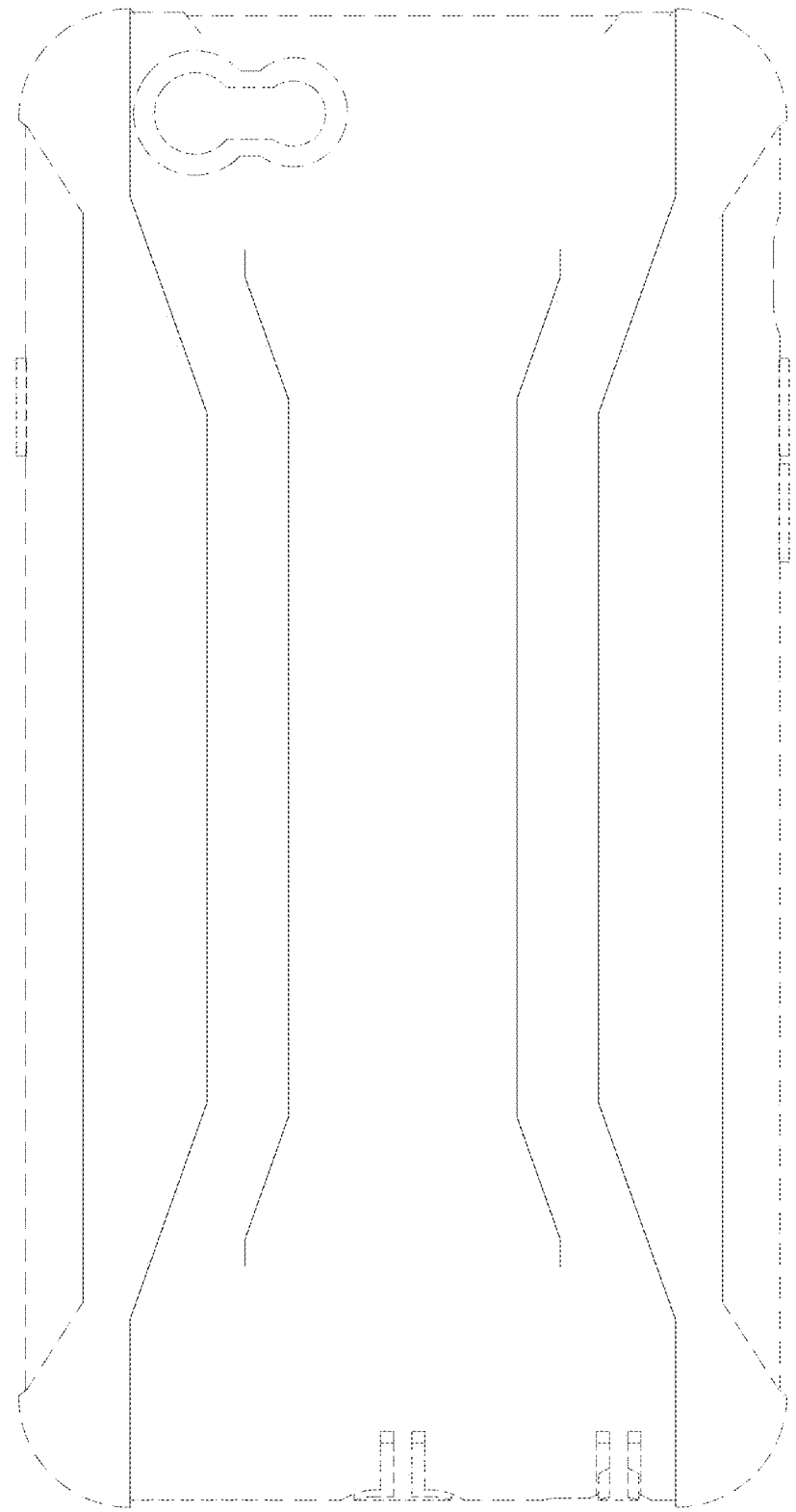
FIG. 12B is a back view of the another aspect for the region of the mobile phone of FIG. 12A.
Figure 12C:
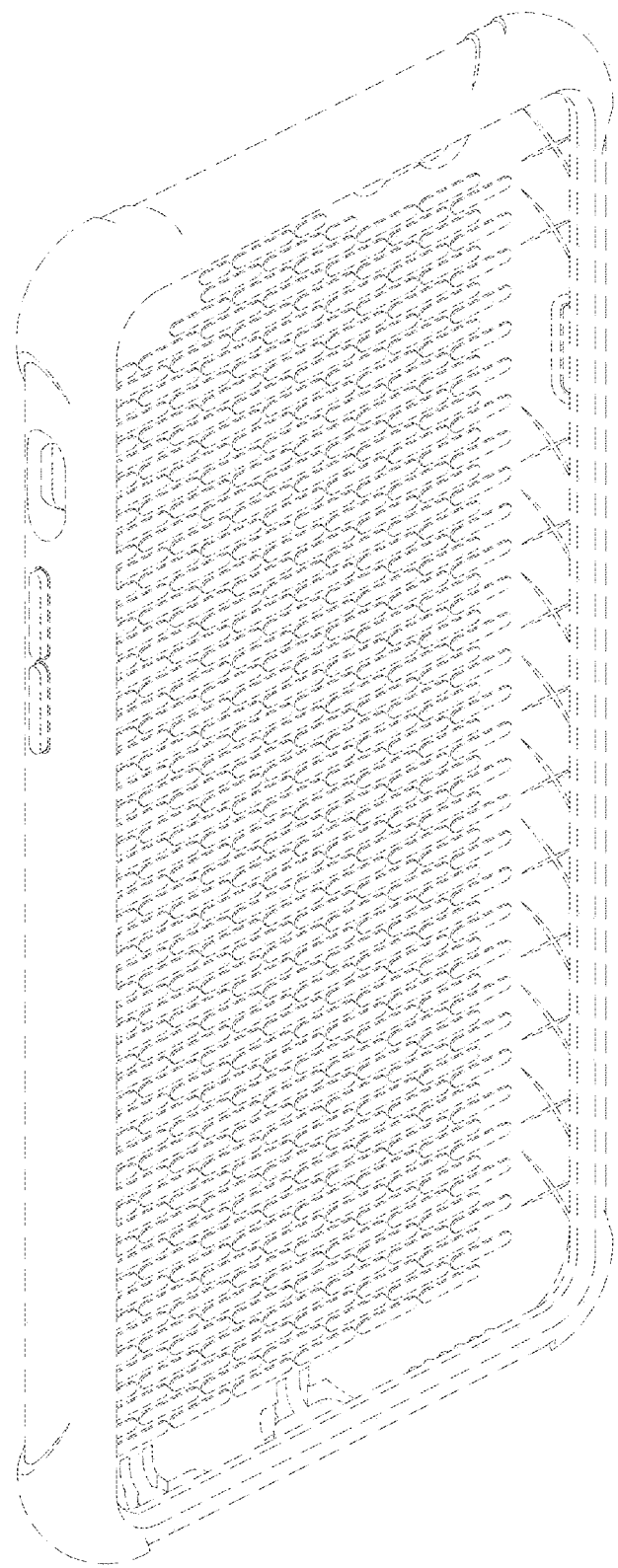
FIG. 12C is a front perspective view of the another aspect for the region of the mobile phone of FIG. 12A.

FIG. 12A is a back perspective view of a cover for a mobile phone. This figure shows some features in dashed lines, but a central elongate feature is emphasized. FIG. 12B shows the same feature(s) in a back plan view. FIG. 12C is a front perspective view where all the visible features are illustrated in dashed lines because the central elongate feature is not visible here. The central elongate feature can have a thicker portion in the middle, and additional surfaces that step down toward the lateral edges of the phone case. Thus, a shank or backbone feature can provide strength and torsion resistance to the phone cover. The phone cover can taper in thickness toward the edges, with the taper coming gradually where no solid lines are shown and the taper coming in periodic steps and ridges where solid lines are shown. Ramp and step functions can be employed together. Thus, this figure depicts that the thickness can ramp down from in the elongate dimension (near the edges) but step down in the shorter lateral dimension, starting closer to the center. The thicker central back portion can provide additional resilient material if a phone falls to the floor and lands squarely on its back. This kind of sudden jarring drop can be particularly dangerous to phones because the force on the entire surface may occur simultaneously. However, a protruding center portion reduces the likelihood of simultaneous force and provides more dissipating resilient material at the point of contact.

Figure 13:
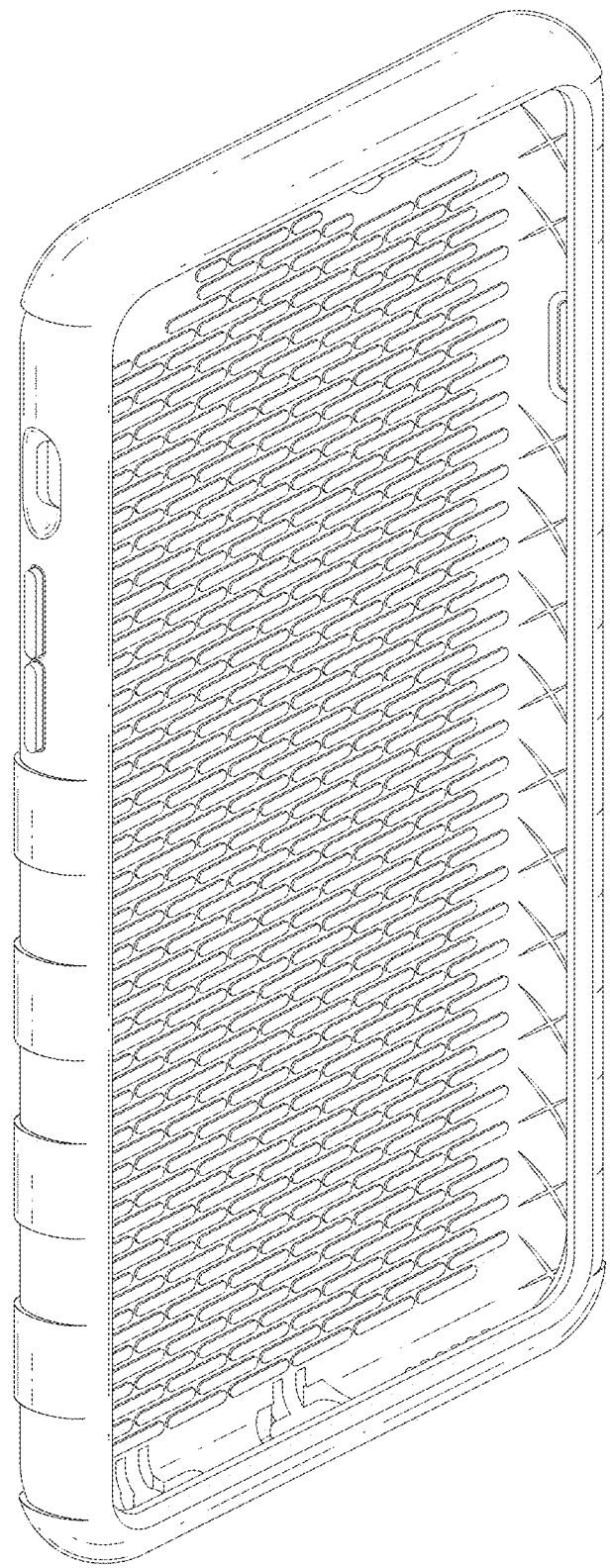
FIG. 13 is a front perspective view of another embodiment of a cover for a region of a mobile phone.
Figure 14:
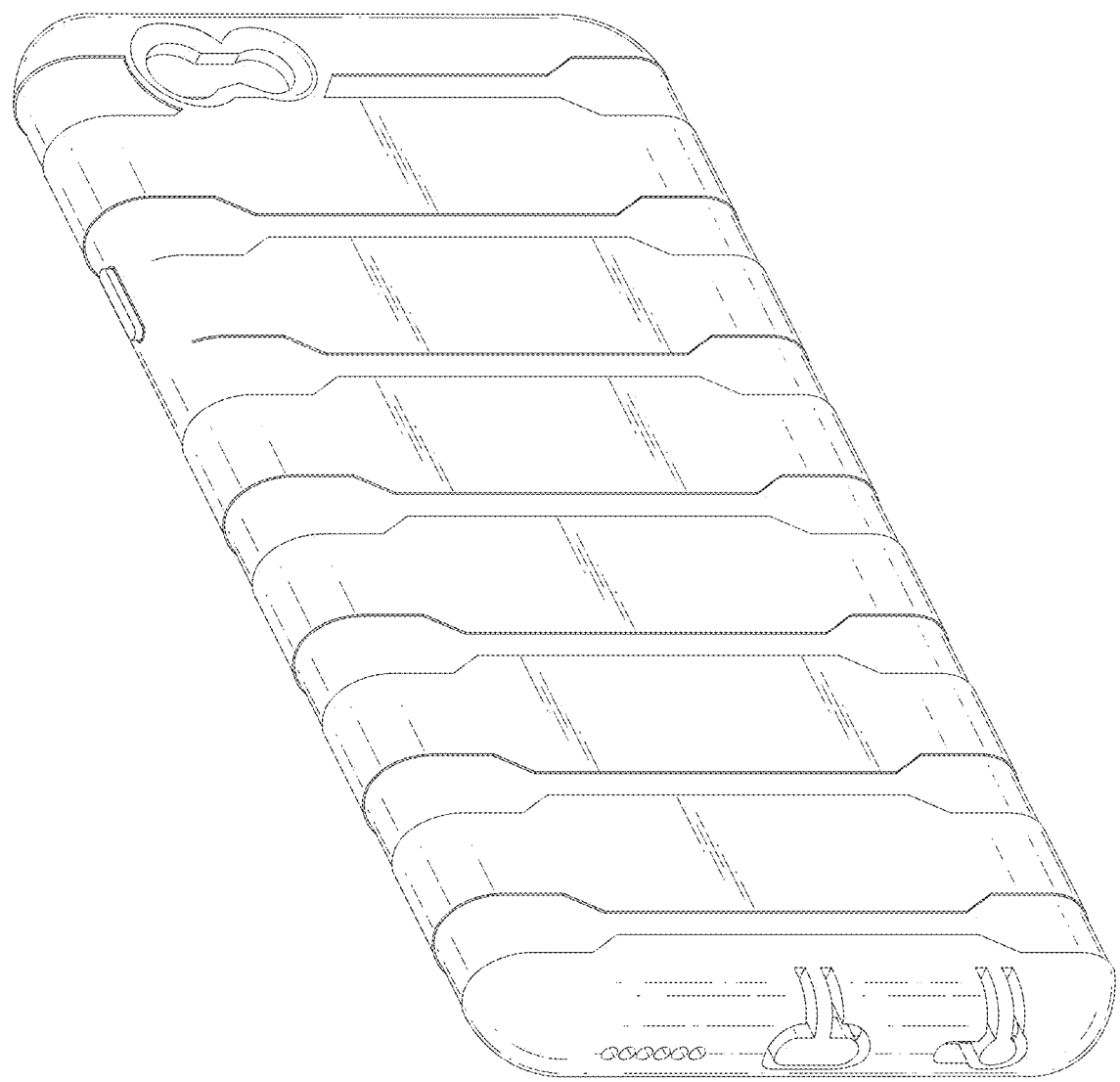
FIG. 14 is a back perspective view of the cover for the region of the mobile phone of FIG. 13.
Figure 15:
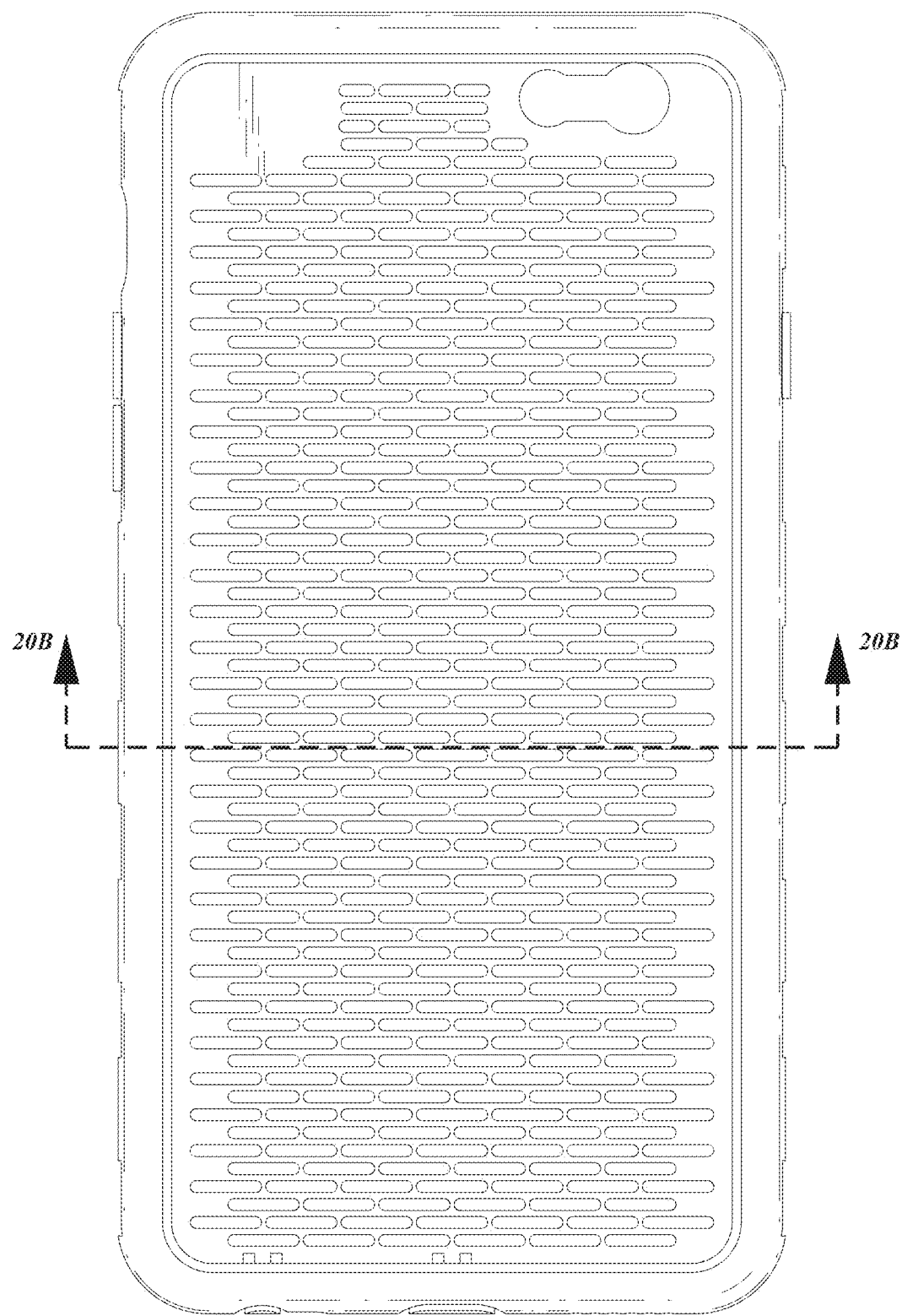
FIG. 15 is a front view of the cover for the region of the mobile phone of FIG. 13.
Figure 16:
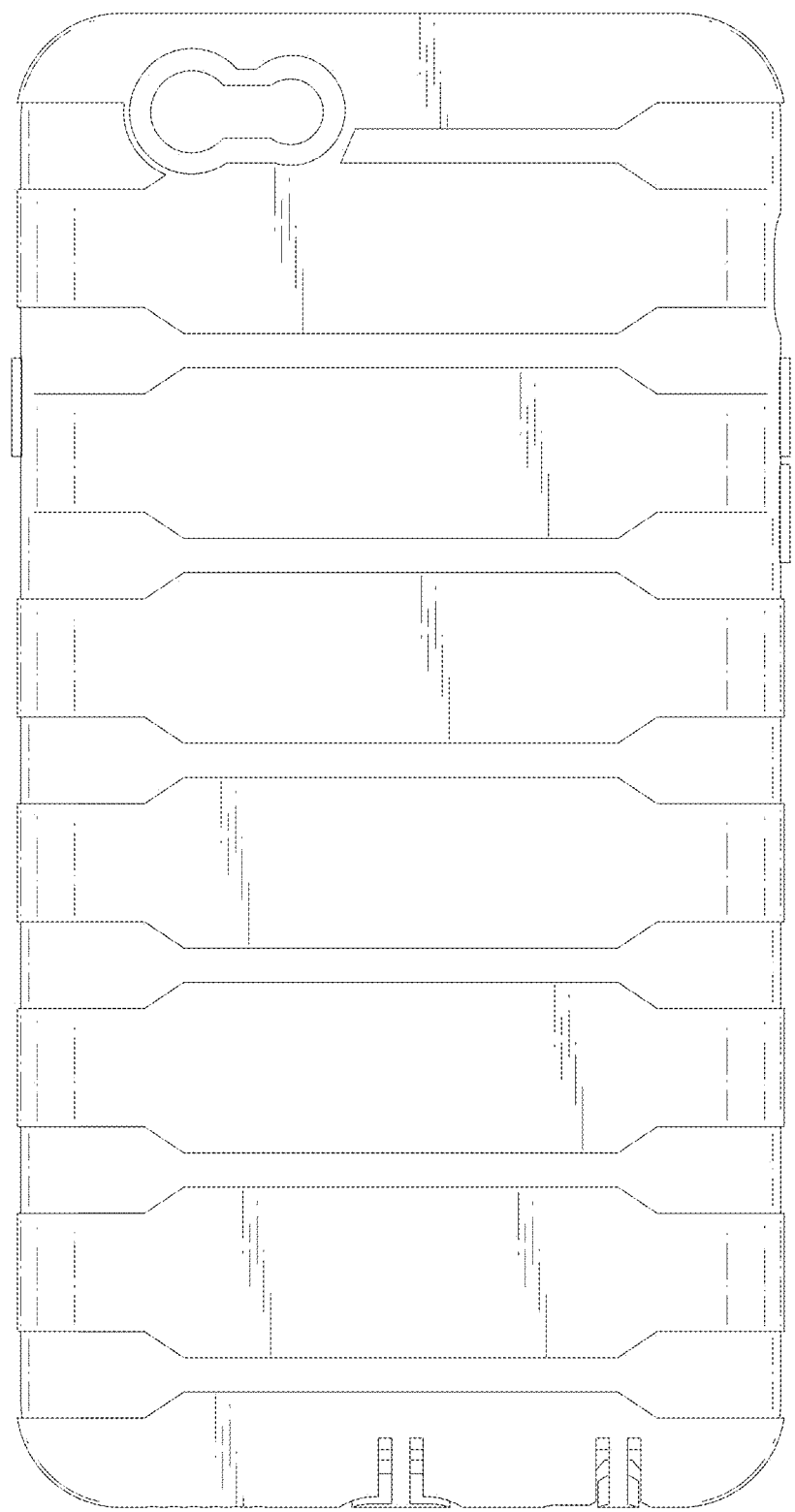
FIG. 16 is a back view of the cover for the region of the mobile phone of FIG. 13.
Figure 17:
FIG. 17 is a right side view of the cover for the region of the mobile phone of FIG. 13.
Figure 18:
FIG. 18 is a left side view of the cover for the region of the mobile phone of FIG. 13.
Figure 19:
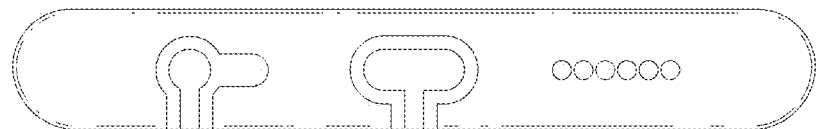
FIG. 19 is a bottom view of the cover for the region of the mobile phone of FIG. 13.
Figure 20A:
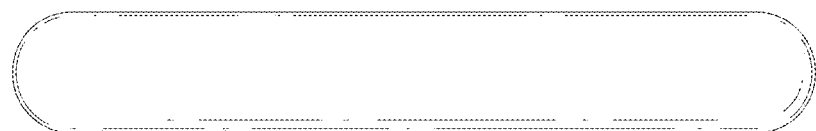
FIG. 20A is a top view of the cover for the region of the mobile phone of FIG. 13.
Figure 20B:
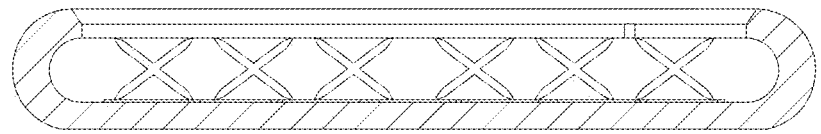
FIG. 20B is a cross-section of the cover for the region of the mobile phone of FIG. 13.

FIG. 13 is a front perspective view of another embodiment of a cover for a region of a mobile phone. In this embodiment, periodic thicker portions stripe the back of the phone and wrap partially around the sides, tapering to be flush at the rim where the phone face is exposed. FIG. 14 is a back perspective view of this striped protrusion embodiment of FIG. 13, providing a more complete view of the periodic thicker portions and showing that they have angles and wider and thinner portions. FIG. 15 is a front plan view of this embodiment, where the slightly protruding stripes are visible in profile at the edges, where these slight protrusions are separated by thinner portions to form subtle crenelations. FIG. 16 is a back plan view of this embodiment. FIG. 17 is side view of the right side of this embodiment. The striped thicker portions taper down to the same thickness as the remainder of the cover toward the left. FIG. 18 is a view of the left side of the cover, where the thicker striped portions taper to the same thickness at the right, where the solid lines stop. FIG. 19 is a bottom view, FIG. 20 is a top view, and FIG. 20B shows a section taken along the line 20B-20B of FIG. 15. This reveals that features (here protruding x-shapes) can be visible along the top inner edge of a phone case cover. This view also shows, with lines along the top showing an angled surface, how the phone case cover can taper inwardly down toward the screen.

Figure 21A:
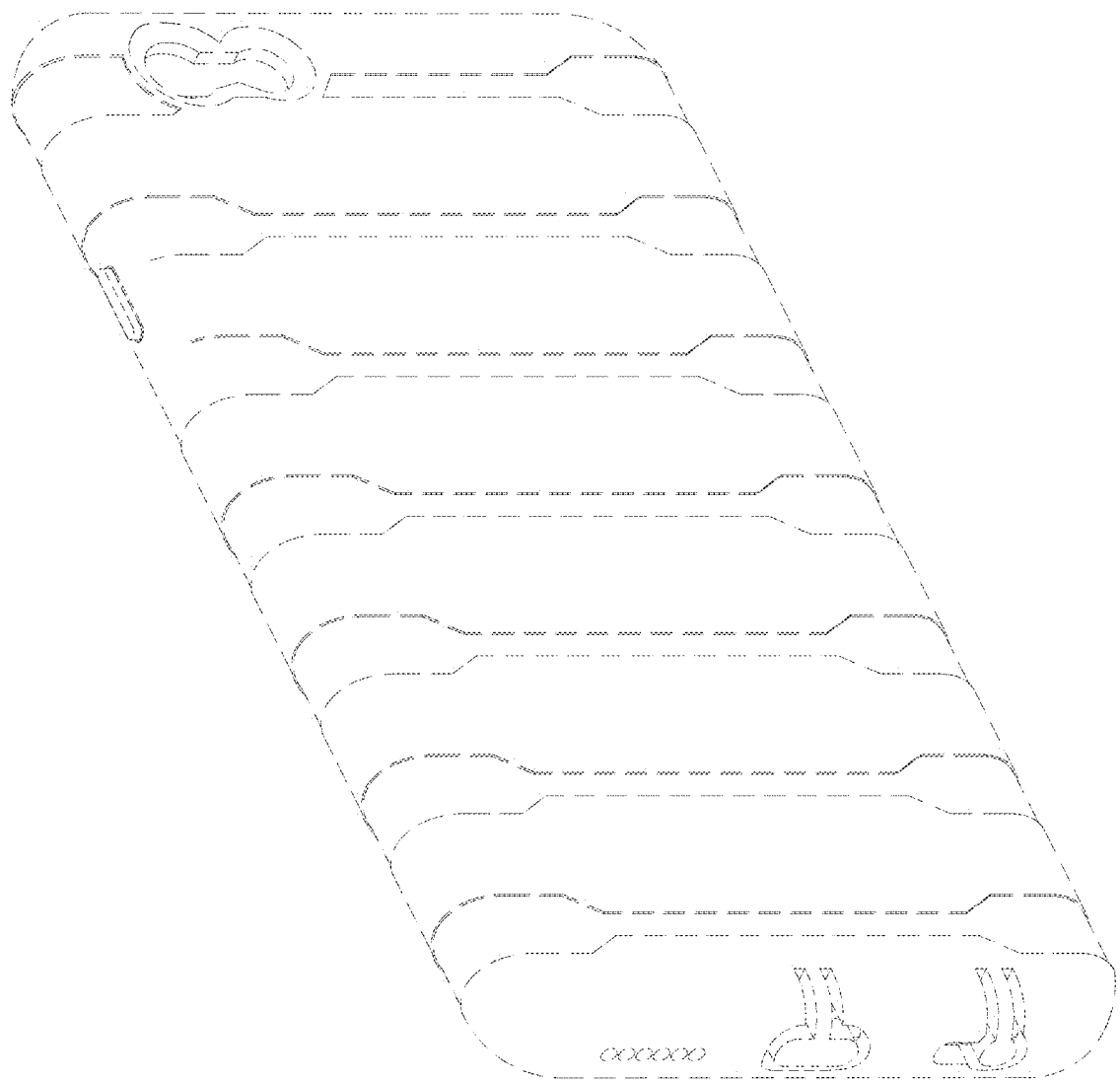
FIG. 21A is a back perspective view of one aspect of the cover for the region of the mobile phone of FIG. 13.
Figure 21B:
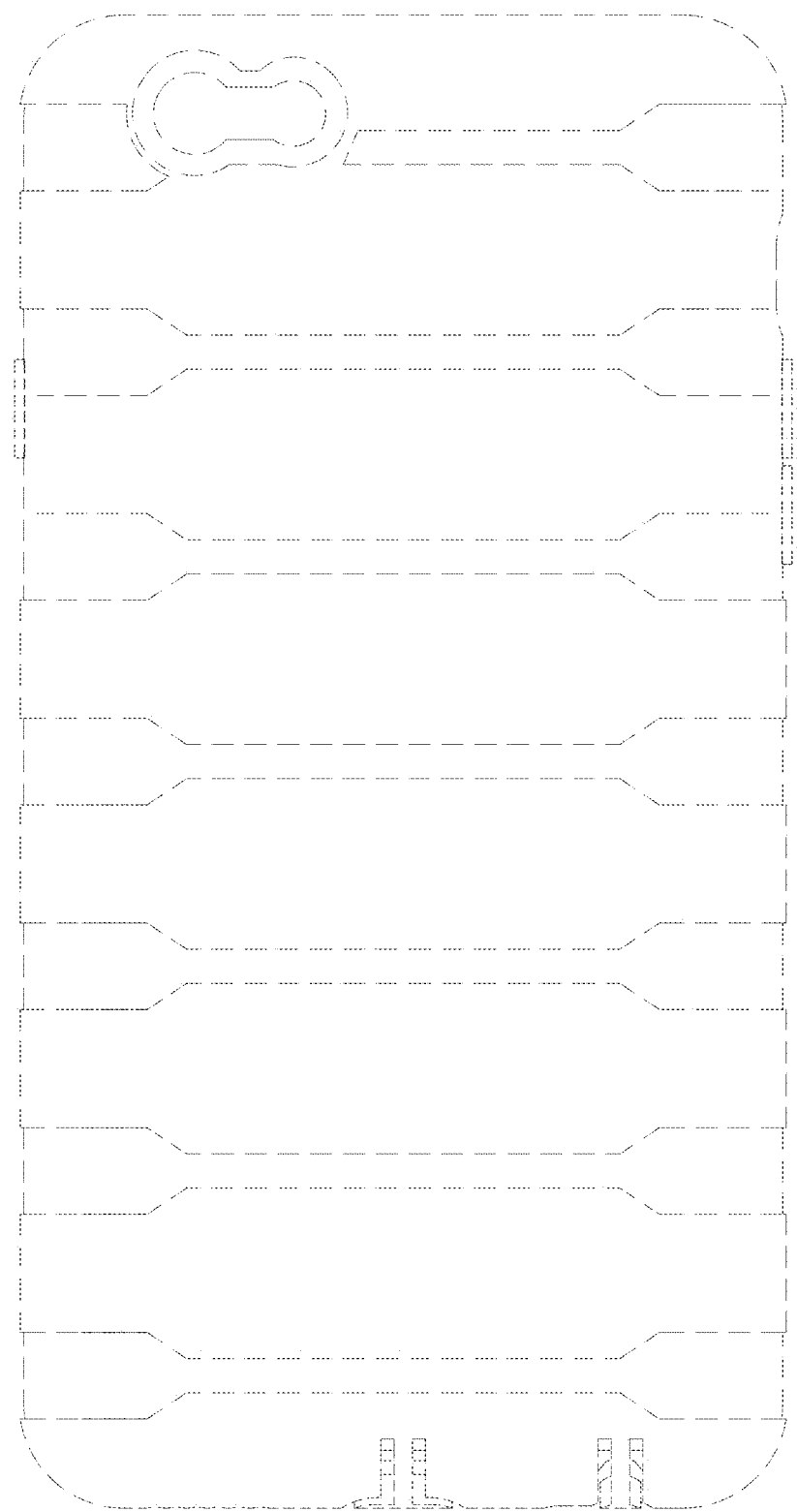
FIG. 21B is a back view of the one aspect of the cover for the region of the mobile phone of FIG. 13.
Figure 21C:
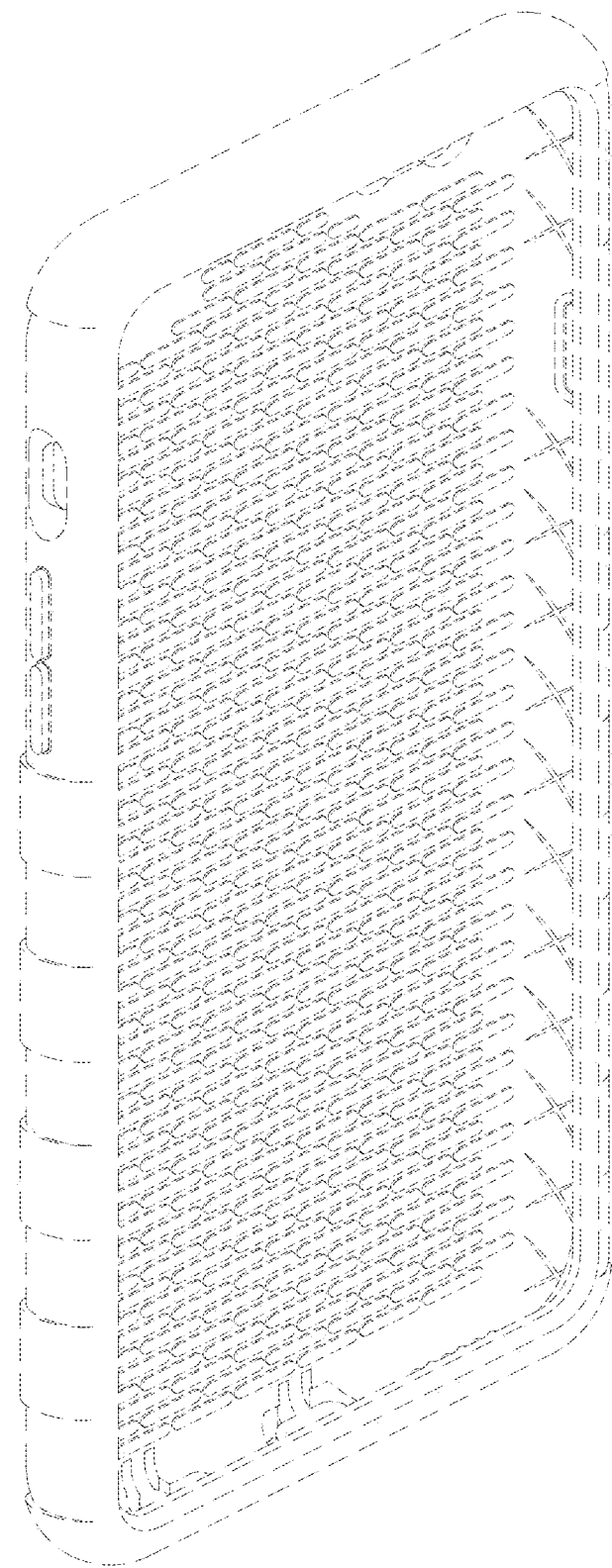
FIG. 21C is a front perspective view of the one aspect of the cover for the region of the mobile phone of FIG. 13.

FIG. 21A is a back perspective view of aspects of the cover for a mobile phone of FIG. 13. FIG. 21B is a back plan view of aspects of the cover for the region of the mobile phone of FIG. 13. FIG. 21C is a front perspective view of aspects of the cover for the region of the mobile phone of FIG. 13.

In some embodiments, the cover can be used for a mobile phone. In some embodiments, the cover can be used for other types of electronic devices, such as a touch pad, a laptop, a camera, remote controls, a global positioning system, gaming controls, television and/or monitors, media players, e-book reader, a radio, a wearable device such as a smart watch, a device charger, a recorder, a memory card, a speaker, a navigation device, a headphone and/or earphone, a thumb drive and/or memory storage device, device including a processor, a device including a memory storage device, a portable electronic device, smartphones, tablet computer, a handheld mobile digital electronic device comprising a tablet computer, electronic book and periodical reader, digital audio and video player, camera, electronic personal organizer, personal digital assistant, electronic calendar, mapping and global positioning system (GPS) device with capability to access to the Internet and send, receive, and store messages and other data, and/or the like.

In some embodiments, at least a portion of the cover can comprise a flexible material. Polymers can be especially useful materials for the disclosed applications. Polyurethanes such as Thermoplastic Polyurethane (TPU) are useful, as are mixtures of softer silicone and harder plastic. The cover can comprise one or more of a plastic, such as a Polyurethane, Polyethylene terephthalate (PET or PETE), High-density polyethylene (HDPE), Polyethylene (PE), Polyvinyl chloride (PVC), Low-density polyethylene (LDPE), Polypropylene (PP), Polystyrene (PS), Polylactic Acid (PLA), Acrylonitrile Butadiene Styrene (ABS), Polycarbonate (PC), Acrylic (PMMA), Acetal (Polyoxymethylene, POM), Nylon (PA), and/or the like. In some embodiments, at least a portion of the cover can comprise one or more of: recycled Polypropylene feedstocks, clarified polypropylene, impact resistant modified polypropylene (e.g., synthetic rubber, metalecines, EVA, elastomers, etc.), plant-based polymers, thermal plastics, and high density polyethylene (HDPE) for low temperature impact performance. HDPE has the advantage of being inert and therefore compatible with a variety of compounds. Thus, testing of compatibility with HDPE may be reduced or avoided. HDPE is also reasonably priced.

In some embodiments, the cover can be made by co-injection technology to incorporate recycle feedstock as a multi-layer structure. Co-injection technology is where two or more individual melt streams unite to make a single article or material. The co-injection technology can be used to apply gas barrier materials in a multi-layer composition. The features and structures disclosed can also be produced by over molding, which is an injection molding process where one material is molded onto a second material.

A variety of surface treatments can be applied to the surface of the cover. For example, one or more surfaces of the cover can be plasma treated or treated differently to enhance aesthetic and/or protective properties.

Thin Mobile Phone Cover

FIG. 22 illustrates an example 2200 of a thin mobile phone cover 2220. When the mobile phone cover 2220 is dropped on the floor 2204, the shock from the floor transfers energy through the mobile phone cover 2202 in all directions (e.g., those shown with arrows 2206A, 2206B, 2206C—collectively referred to as directions 2206).

The back portion 2208 of the mobile phone cover 2200 is flat. The complete surface of the back portion 2208 of the mobile phone cover 2200 touches the mobile phone cover in a flush and complete manner. Thus, the shock energy is transferred from the mobile phone cover 2200 directly to the phone, causing an increase chance of electronic and other component damage and/or cracking of the phone screen and damage to other parts of the phone.

The side portion 2210 of the mobile phone cover 2200 is rounded to match the shape of the side of a mobile phone. However, the surface of the rounded side portion 2210 of the mobile phone cover 2200 is also flat, causing the shock from impact to be transferred also directly to the phone. Thus, a design such as this may have drawbacks. Impact energy is primarily dissipated within the material of the cover itself but energy dissipation does not come from and particular structural features of this think flush phone case design.

The corner portion 2212 of the mobile phone cover 2200 is the same thickness as other portions of the mobile phone cover 2200, such as the side portion 210 of the mobile phone cover 2200. Thus, the corner portion 2212 does not provide additional shock absorption features than the other portions of the mobile phone cover 2200.

If the mobile phone cover 2200 is made of hard plastic, the material itself may not be flexible or provide adequate energy absorption or dissipation features. If it is too rigid, the shock caused by the impact may be transferred directly to the mobile phone and provide very little protective benefit or sufficient shock absorption for a mobile phone upon impact.

Shock Absorbing Corner

FIGS. 23A and 23B illustrate examples of a mobile phone cover 2300, 2350 with a thicker corner 2306, according to some embodiments. FIG. 23A illustrates a perspective view of the indicated corner portion of FIG. 24A. The corner 2306 of the mobile phone cover is thicker than the side portions of the mobile phone cover.

In the example of FIG. 23A, when the mobile phone cover 2300 is dropped, the impact from the floor 2304 causes energy to be dissipated through the mobile phone cover 2300. The mobile phone cover 2300 comprises flexible material, such as one or more of a plastic, such as Polyethylene terephthalate (PET or PETE), High-density polyethylene (HDPE), Polyethylene (PE), Polyvinyl chloride (PVC), Low-density polyethylene (LDPE), Polypropylene (PP), Polystyrene (PS), Polylactic Acid (PLA), Acrylonitrile Butadiene Styrene (ABS), Polycarbonate (PC), Acrylic (PMMA), Acetal (Polyoxymethylene, POM), Nylon (PA), and/or the like. The flexible plastic can absorb at least a portion of the shock before the shock energy reaches the mobile phone. The plastic flexible material can absorb more of the shock than the rigid hard plastic described in FIG. 22.

In some embodiments, the thicker corner 2306 of the mobile phone cover 2300 causes the shock to be absorbed more than other portions of the mobile phone cover 2300 because of the increased thickness. The angles of the thicker corner 2306 can also cause energy to propagate along the edge of the phone case or to dissipate along more tortuous and/or dispersed pathways, thereby reducing the absolute value of energy that may reach the outer surface of a phone within the case. Dissipation of energy can cause shock waves to be more widely, diffusely, and/or randomly distributed.

In FIG. 23B, the thickness 2352 of the corner 2306 can be thicker than the thickness of the side portion 2354 of the mobile phone cover 2350. The corner 2306 of the mobile phone cover 2350 can include a protrusion that forms the thickness 2352. The corner 2306 of the mobile phone cover 2350 can include a single step 2360 from a wall of the mobile phone cover 2350, such as a side wall of the mobile phone cover 2350. The corner 2306 of the mobile phone cover 2350 can include a plurality of steps, such as a first step 2356 and a second step 2358 from a wall of the mobile phone cover 2350, such as a top wall.

In some embodiments, the corner 2306 can connect with a protrusion on the back wall of the cover, such as a protrusion on the back wall that runs along the length and/or width of the cover, which can help disperse the shock to the back wall of the phone cover, and away from the mobile phone. Thus, multiple protrusions can be integrally formed, thereby allowing energy to pass between them and more effectively disperse. A shock experienced at a corner can transfer collision energy along the length of a series of connected protruding features, thereby reducing energy transfer directly to a phone. Energy can continue to be dissipated through a resonance or other wobbling of these physical structures and the molecular structures within them. Molecular bonds within resilient materials such as rubber or resilient plastics can provide play in the joints, leading to the resilient properties useful to shock absorption, dissipation, or shunting away from a phone within a case.

Shock Absorbing X Structure

FIG. 24A illustrates an example 2400 of a mobile phone 2404 insertable into a mobile phone cover 2402. A close-up view 25A is illustrated within FIG. 25, and another close-up view 23A is also illustrated in the corner (and corresponds to FIG. 23A).

FIG. 24B illustrates an example 2450 of a mobile phone 2404 inserted into a mobile phone cover 2402. The cover can include one or more protrusions that reduce the flush contact surface to the mobile phone, such as the X protrusions 2454. The X protrusions 2454 can provide shock absorbing characteristics by reducing the contact surface between the cover and the phone, increasing the air pockets immediately surrounding the phone, and reducing the transfer of shock after impact to the mobile phone by allowing the mobile phone cover 2402 to absorb more of the shock. For example, an arm of an X protrusion 2454 can bend or flex after impact and move into an air pocket 2452.

In some embodiments, the X protrusions 2454 protrude from the side wall of the mobile phone cover 2402, creating air pockets 2452 between the mobile phone cover 2402 and the mobile phone 2404. Upon impact, the mobile phone cover 2402 can absorb more of the shock via the air pockets 2452 allowing the flexible plastic of the mobile phone cover 2402 to bend into the air pockets 2452 instead of directly placing pressure on the mobile phone 2404.

In some embodiments, the protrusions, such as the X protrusions 2454, are of a certain thickness, shape, and/or length to increase a hold factor (e.g., how well the mobile phone cover grasps the mobile phone) of the mobile phone 2404 when the mobile phone 2404 is placed into the mobile phone cover 2402. In some embodiments, the protrusions, such as the X protrusions 2454, are of a certain thickness, shape, and/or length based on a comparison, such as a ratio, between the hold factor and a shock-absorbing characteristic. The illustrated shapes and thicknesses provide a useful example of a good balance between gripping and shock absorbing characteristics.

Shock Absorbing Oval Structure

FIG. 25A illustrates example protrusions 2504 on the inside portion of a back wall for the mobile phone cover 2502, according to some embodiments. FIG. 25A is a close-up of a portion of FIG. 24A, as indicated by annotations in that figure.

In some embodiments, the one or more protrusions 2504A, 2504B, 2504C, 2504D, 2504E (collectively referred to herein as protrusions 2504) can be of an oval shape that has a flat face configured to contact the back of a mobile phone. The one or more protrusions 2504 (and the spaces between them) can reduce the contact surface between the cover and the mobile phone and provide shock absorbing characteristics when the mobile phone is housed by the cover. The protrusions 2504 can be separated by air pockets 2506. The air pockets 2506 can allow space for the flexible plastic to bend in response to shock, enabling the mobile phone cover 2502 to absorb and disperse more of the shock, rather than transferring it directly to the mobile phone.

In some embodiments, the one or more protrusions 2504 can bend into the air pockets 2506 when a collision occurs in a direction influenced by the position of impact. For example, the shock 2508A, 2508B can come from an shown by the arrows 2508A and 2508B. The one or more protrusions 2504 can bend into the air pocket above the one or more protrusions 2504. In some embodiments, the bending can temporarily change the shape of the one or more protrusions 2504 during the shock. In some embodiments, the flexible material of the cover can enable the one or more protrusions 2504 to return to their earlier shape in a resilient manner.

In some embodiments, the one or more protrusions 2504 can establish a regular array in a collection of rows. For example, protrusions 2504A, 2504B can be distributed along one row, and protrusions 2504C, 2504D can be distributed along another row.

In some embodiments, the distribution of the one or more protrusions 2504 can enable increased traction and shock absorption along certain axes. For example, the protrusions 2504A, 2504B are aligned in a row, and can help traction and/or shock absorption characteristics along the width of the phone. The protrusions 2504A, 2504C are aligned in a column, and can help traction and/or shock absorption characteristics along the length of the phone. The protrusions 2504C, 2504E are aligned along the diagonal axis, and can help traction and/or shock absorption characteristics along the diagonal of the phone.

Water Release Structure

FIG. 25B illustrates an example 2525 of a mobile phone with the mobile phone cover 2527 dropped into water 2529. The mobile phone cover 2527 includes air pockets enabling water to flow away from the mobile phone. For example, if any water enters the phone case and is positioned adjacent the phone itself, a series of air pockets can form effective channels to drain the water down so that it is not trapped next to the phone. Those channels can comprise the spaces between oval protrusions and between X features. Moreover, those channels can be in fluid communication with the outside of a phone cover (e.g., through a phone charger opening), thereby allowing drainage. Drain holes can double as speaker holes, etc.

FIG. 25C illustrates an example 2550 of water 2552A, 2552B flowing through the air pockets of the back wall of the mobile phone cover, according to some embodiments. The water 2552A, 2552B can flow in between the oval protrusions 2504 and through the air pockets 2506.

FIG. 25D illustrates an example 2575 of water 2581A, 2581B flowing through the air pockets of the side wall of the mobile phone cover, according to some embodiments. The water 2581A, 2581B can flow in between the X protrusions 2577 and through the air pockets 2579.

Shock Absorbing Case Cover

FIG. 26 illustrates an example 2600 of a mobile phone cover 2602 with protrusions on the outer portion of a back wall. Upon impact of the phone cover 2602 with a hard object or surface, such as a floor 2604, energy from the impact can be dispersed in various directions, such as directions 2606A, 2606B, 2606C, 2606D, 2606E, 2606F, 2606G, 2606H (collectively referred to herein as direction 2606).

In some embodiments, the protrusion can increase the dispersion across the mobile phone cover 2602 via the protrusions, reducing energy transfer to the mobile phone itself. In some embodiments, the corner 2608 can be in contact with, integrally formed with, and/or attached to an elongate central back protrusion such that the shock can be dispersed in particular directions 2606. The shock can be dispersed from the corner 2608 to one protrusion in a first direction 2606F, a second direction 2606G, and a third direction 2606H. The shock can also be dispersed through a second protrusion in a fourth direction 2606A, a fifth direction 2606C, a sixth direction 2606D, and a seventh direction 2606E, and from the corner 2608 to an eighth direction 2606B. The dispersion in the direction 2606B can distribute energy through or along a width axis of the mobile phone case, the directions 2606C and 2606 G can distribute energy through a length axis of the mobile phone case, and/or the directions 2606A, 2606D, 2606E, 2606F, and 2606H can distribute energy through a diagonal axis of the mobile phone case. Energy can be distributed, absorbed, and/or dispersed simultaneously or serially.

FIG. 27 illustrates an example 2700 of a mobile phone cover 2702 with striped protrusions on the outer portion of a back wall. Upon impact of the phone cover 2702 with the floor 2704 (in the manner shown or along one of its long edges), the shock can be dispersed in particular directions, such as direction 2706A, 2706B, 2706C, 2706D, 2706E, 2706F, 2706G (collectively referred to herein as direction 2706).

In some embodiments, the protrusions can increase the dispersion of energy across the mobile phone cover 2702 via the protrusions instead of transferring energy to the mobile phone. In some embodiments, the corner 2708 can be part of or connected with other protruding features such that the shock can be dispersed in a particular direction 2706. Energy from an impact may be effectively dispersed along a series of thicker and thinner portions as they bend toward and away from each other. The shock can be dispersed in direction 2706B from a corner to one protrusion that runs along the length of the mobile phone case 2702, and can absorb shock via the length axis of the mobile phone case. The shock can also be dispersed in direction 2706A along the length of the mobile phone case 2702 such that the shock is dispersed along the length axis of the mobile phone case 2702. When the shock is dispersed along the length, a shock wave can proceed along the width of the mobile phone case 2702 in directions 2706C, 2706D, 2706E, 2706F, 2706G. Advantageously, shock energy can travel in a certain direction, such as along the entire length or width of the mobile phone case. Longer energy paths can provide more time for the materials to absorb, disperse, or otherwise attenuate the energy of impact. The protrusions' shape and relative placement can configure a phone case such that the shock can be dispersed in certain directions to avoid critical components, such as a camera lens or a port (e.g., charge port, phone port).

Twistable Case Cover

FIG. 28 illustrates an example of a mobile phone cover 2800 that can be twisted as shown. It can absorb or otherwise effectively addresses torsion forces. The cover can comprise a flexible plastic that resiliently deform under a twisting force. In contrast to mobile phone covers that rigidly resist torsion, allowing impact energy to transfer directly into the phone, the mobile phone cover 2800 of FIG. 28 can accommodate and resiliently absorb torsion forces, thereby addressing potential harm from them. Some embodiments include a thicker elongate feature along the back of the phone case that can act as a shank to strengthen the case and resiliently resist torsion, especially in directions orthogonal to the elongate dimension of the shank (which can but need not correspond to an elongate dimension of the phone). FIG. 28 also shows X-mark features along the external edges of the sidewall of the phone case. These features can provide gripping functions as well as impact force dispersion functions. A user's fingers can be less likely to drop a phone case when it has protruding features such as these or is otherwise non-slippery on its external side walls.

Additional Implementation Details and Embodiments

Many variations and modifications may be made to the above-described embodiments, the elements of which are to be understood as being among other acceptable examples. All such modifications and variations are intended to be included herein within the scope of this disclosure. The foregoing description details certain embodiments. However, no matter how detailed the foregoing appears in text, the systems and methods can be practiced in many ways. Use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A cover for a region of a mobile phone, the cover comprising:
   a back wall comprising an outer portion and an inner portion;
   a left side wall extending from a first side of the back wall and comprising an outer portion and an inner portion;
   a right side wall extending from a second side of the back wall and comprising an outer portion and an inner portion;
   a bottom wall extending from a third side of the back wall and comprising an outer portion and an inner portion;
   a top wall extending from a fourth side of the back wall and comprising an outer portion and an inner portion, wherein the cover is capable of housing the mobile phone;
   a first plurality of protrusions, at least some of the first plurality of protrusions disposed on the inside portion of at least one of: the left side wall, the right side wall, the top wall, or the bottom wall, wherein the at least some of the first plurality of protrusions reduce a contact surface between the cover and the mobile phone and provide shock absorbing characteristics at least along a length axis of the cover when the mobile phone is housed by the cover; and
   an elongate thickened spine that extends along more than half the length of the back of the phone case, the spine configured to fill the role of a shank that resiliently resists torsion of the phone case.

2. The cover of claim 1, wherein the first plurality of protrusions are disposed on the inside portion of the left side wall or the right side wall.

3. The cover of claim 1, wherein the first plurality of protrusions are disposed on the inside portion of the top wall.

4. The cover of claim 1, wherein the first plurality of protrusions are disposed on the inside portion of the bottom wall.

5. The cover of claim 1, wherein the first plurality of protrusions comprise an X shape.

6. The cover of claim 1, wherein the cover further comprises a second plurality of protrusions are on one or more corners of the cover that are elevated from a wall of the plurality of walls by at least one step.

7. The cover of claim 1, wherein the cover further comprises a second plurality of protrusions are on the outer portion of the back wall.

8. A cover for a region of a mobile phone, the cover comprising:
- a back wall comprising an outer portion and an inner portion;
- a left side wall extending from a first side of the back wall and comprising an outer portion and an inner portion;
- a right side wall extending from a second side of the back wall and comprising an outer portion and an inner portion;
- a bottom wall extending from a third side of the back wall and comprising an outer portion and an inner portion;
- a top wall extending from a fourth side of the back wall and comprising an outer portion and an inner portion, wherein the cover is capable of housing the mobile phone;
- a first plurality of protrusions, at least some of the first plurality of protrusions disposed on the inside portion of at least one of: the left side wall, the right side wall, the top wall, or the bottom wall, wherein the at least some of the first plurality of protrusions reduce a contact surface between the cover and the mobile phone and provide shock absorbing characteristics at least along a width axis of the cover when the mobile phone is housed by the cover;
- a second plurality of protrusions comprising an oval surface having a flat surface disposed on the inside portion of the back wall providing shock absorbing characteristics when the mobile phone is housed by the cover; and
- an elongate thickened spine that extends along more than half the length of the back of the phone case, the spine configured to fill the role of a shank that resiliently resists torsion of the phone case.

9. The cover of claim 8, wherein a protrusion of the first plurality of protrusions are disposed adjacent to another protrusion of the first plurality of protrusions.

10. The cover of claim 8, wherein at least some of the first plurality of protrusions disposed on the inner portion of at least one of: the left side wall, the right side wall, the top wall, or the bottom wall provide the shock absorbing characteristics at least along a length axis of the cover.

11. The cover of claim 8, wherein at least some of the first plurality of protrusions disposed on the inner portion of at least one of: the left side wall, the right side wall, the top wall, or the bottom wall provide the shock absorbing characteristics at least along a diagonal axis of the cover.

12. The cover of claim 8, wherein at least some of the first plurality of protrusions on one or more corners are elevated from a wall of the plurality of walls by two steps.

13. The cover of claim 8, wherein at least some of the first plurality of protrusions are disposed on four corners of the cover.

14. The cover of claim 8, wherein the cover comprises flexible plastic.

15. A phone case comprising:
- a phone enclosure having a back and four sides formed from flexible material, the phone enclosure configured to surround all sides of a phone except at least a portion of a face of the phone;
- at least one array of resilient protruding structures arranged within the phone enclosure and configured to protrude from an interior surface of the phone case toward the phone,
- wherein the protruding structures are integrally formed with the flexible material of the enclosure and configured to absorb shock by temporarily changing shape when force is applied along one or more of length, width, or diagonal axis of the phone, and
- wherein at least some of the protruding structures are disposed on an outer portion of the back side to provide the shock absorbing characteristics at least along a length or width axis of the phone case; and
- an elongate thickened spine that extends along more than half the length of the back of the phone case, the spine configured to fill the role of a shank that resiliently resists torsion of the phone case.

16. The phone case of claim 15, wherein at least some of the protruding structures are disposed on an outer portion of the back side to provide the shock absorbing characteristics at least along a diagonal axis of the phone case.

17. The phone case of claim 15, wherein the phone case further comprises enlarged corner bumpers integrally formed with the phone case.

* * * * *